US012148386B2

(12) United States Patent
Kim et al.

(10) Patent No.: US 12,148,386 B2
(45) Date of Patent: Nov. 19, 2024

(54) DISPLAY DEVICE

(71) Applicant: LG Display Co., Ltd., Seoul (KR)

(72) Inventors: Byeongchul Kim, Paju-si (KR); Dongsup Sim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/525,426

(22) Filed: Nov. 30, 2023

(65) Prior Publication Data

US 2024/0242672 A1 Jul. 18, 2024

(30) Foreign Application Priority Data

Jan. 17, 2023 (KR) ........................ 10-2023-0006566

(51) Int. Cl.
*G09G 3/20* (2006.01)
*G09G 3/3233* (2016.01)

(52) U.S. Cl.
CPC ... *G09G 3/3233* (2013.01); *G09G 2300/0426* (2013.01); *G09G 2300/0452* (2013.01); *G09G 2300/0819* (2013.01); *G09G 2300/0842* (2013.01); *G09G 2310/08* (2013.01); *G09G 2320/0242* (2013.01); *G09G 2320/041* (2013.01); *G09G 2330/021* (2013.01)

(58) Field of Classification Search
CPC ......... G09G 3/3233; G09G 2300/0426; G09G 2300/0452; G09G 2300/0819; G09G 2300/0842; G09G 2310/08; G09G 2320/0242; G09G 2320/041; G09G 2330/021; G09G 3/2074; G09G 2300/0439; G09G 2320/0214; G09G 2320/0233; G09G 2320/0247; G09G 2340/0435
See application file for complete search history.

(56) References Cited

U.S. PATENT DOCUMENTS

| | | | | |
|---|---|---|---|---|
| 6,320,322 B1 * | 11/2001 | Tanaka | G09G 3/3216 315/169.3 |
| 2006/0007077 A1 * | 1/2006 | Joo | G09G 3/3208 345/77 |
| 2014/0354713 A1 * | 12/2014 | Kim | G09G 3/3258 345/694 |
| 2019/0088200 A1 * | 3/2019 | Woo | G09G 3/3275 |
| 2021/0351226 A1 * | 11/2021 | Chong | H01L 33/385 |
| 2022/0086978 A1 * | 3/2022 | Archer | H05B 45/10 |
| 2024/0021155 A1 * | 1/2024 | Hwang | G09G 3/3233 |

* cited by examiner

*Primary Examiner* — Antonio Xavier
(74) *Attorney, Agent, or Firm* — Birch, Stewart, Kolasch & Birch, LLP

(57) ABSTRACT

A display device in one example includes a first sub-pixel, a second sub-pixel, and a third sub-pixel, where each of the first sub-pixel, the second sub-pixel, and the third sub-pixel includes a driving transistor, a first transistor, and a second transistor. The driving transistor includes a gate electrode connected to a first node, a first electrode connected to a second node, and a second electrode connected to a third node, and provides a driving current to a light emitting diode. The first transistor includes a first electrode receiving a bias voltage, a second electrode connected to the second node, and a gate electrode to which a third scan signal is applied. The second transistor includes a first electrode connected to the third node, a second electrode connected to an anode of the light emitting diode, and a gate electrode to which an emission control signal is applied.

8 Claims, 11 Drawing Sheets

DISPLAY DEVICE

CROSS-REFERENCE TO RELATED APPLICATION

The present application claims priority to Korean Patent Application No. 10-2023-0006566, filed on Jan. 17, 2023 in the Republic of Korea, the entire contents of which is hereby expressly incorporated by reference into the present application.

BACKGROUND

Field

The disclosure relates to a display deice with improved color displays.

Discussion of the Related Art

With development of information society, various needs for a display device that displays an image are increasing. As such, various types of display devices, such as a liquid crystal display device, and an organic light emitting diode display, are being used.

An image displayed on the display device can include a still image or a moving image, where the moving image can be of various types such as sports images, game images, and movies. The display device can operate in a variable refresh rate (VRR) mode in which a driving frequency is varied according to the types of images, thereby reducing power consumption and extending the life of the display device.

However, when the pixel circuits are driven at various refresh rates in the VRR mode, a difference in brightness can occur between the pixel circuits due to the different refresh rates, which can cause quality degradation such as image distortion or flickers.

SUMMARY OF THE DISCLOSURE

An aspect of the disclosure is to provide a display device which addresses or minimizes temperature-dependent color abnormality that may be caused by a leakage current between sub-pixels of the display device.

Problems and limitations, which the disclosure addresses, are not limited to those mentioned above, and other technical problems and limitations that are addressed by the disclosure can be understood based on the following description of the embodiments of the disclosure.

According to an embodiment of the disclosure, a display device includes a first sub-pixel, a second sub-pixel, and a third sub-pixel, wherein each of the first sub-pixel, the second sub-pixel, and the third sub-pixel includes a driving transistor, a first transistor and a second transistor. The driving transistor includes a gate electrode connected to a first node, a first electrode connected to a second node, and a second electrode connected to a third node, and provides a driving current to a light emitting diode. The first transistor includes a first electrode receiving a bias voltage, a second electrode connected to the second node, and a gate electrode to which a third scan signal is applied. The second transistor includes a first electrode connected to the third node, a second electrode connected to an anode of the light emitting diode, and a gate electrode to which an emission control signal is applied. Further, the bias voltages applied to the first electrodes of the first transistors in the first sub-pixel, the second sub-pixel, and the third sub-pixel are different in level.

According to an embodiment of the disclosure, display panel includes a first sub-pixel, a second sub-pixel, and a third sub-pixel, where each of the first sub-pixel, the second sub-pixel, and the third sub-pixel includes a driving transistor, a first transistor, and a second transistor. The driving transistor includes a gate electrode connected to a first node, a first electrode connected to a second node, and a second electrode connected to a third node, and provides a driving current to a light emitting diode. The first transistor includes a first electrode for receiving a bias voltage, a second electrode connected to the second node, and a gate electrode to which a third scan signal is applied. The second transistor includes a first electrode connected to the third node, a second electrode connected to an anode of the light emitting diode, and a gate electrode to which an emission control signal is applied, wherein the bias voltages applied to the first electrodes of the first transistors in the first sub-pixel, the second sub-pixel, and the third sub-pixel are different in level.

Details of other embodiments of the disclosure are included in the detailed description and the accompanying drawings.

According to embodiments of the disclosure, temperature-dependent color abnormality which can be caused by a leakage current between sub-pixels of a display panel is improved by adjusting the level of the bias voltages applied to the sub-pixels.

Further, effects obtainable from the disclosure may not be limited by the aforementioned effects, and other unmentioned effects can be clearly understood from the following description by a person having ordinary knowledge in the art to which the disclosure pertains.

BRIEF DESCRIPTION OF THE DRAWINGS

The disclosure will become more fully understood from the detailed description given hereinbelow and the accompanying drawings which are given by way of illustration only, and thus are not limitative of the disclosure.

DETAILED DESCRIPTION OF THE EMBODIMENTS

Figure 1:
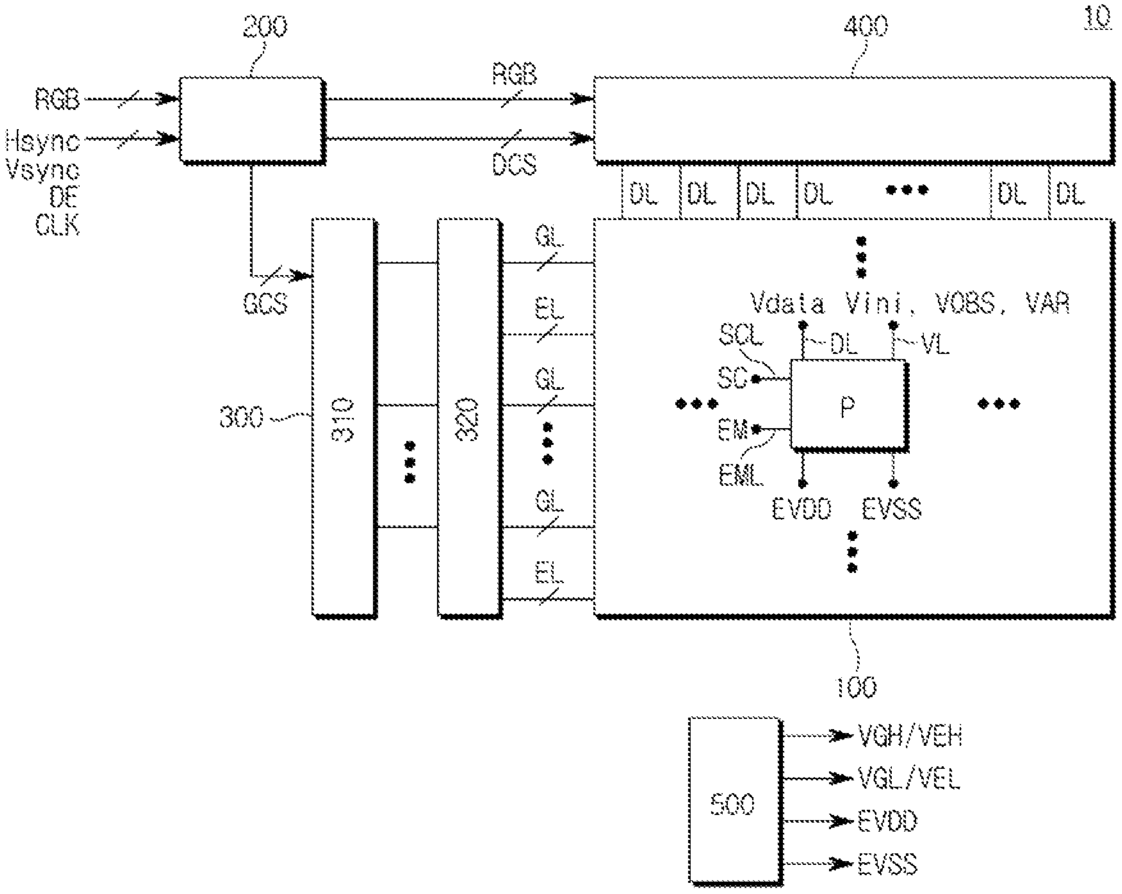
FIG. 1 is a schematic block diagram of a display apparatus according to an embodiment of the disclosure.

Below, embodiments of the disclosure will be described with reference to the accompanying drawings. In this specification, it will also be understood that when one component (or region, layer, portion, etc.) is referred to as being "on", "over", "above", "connected to", or "coupled to" another component, it can be directly connected/coupled on/to the one component, or one or more intervening other components can also be present.

Like reference numerals refer to like elements throughout. Further, in the drawing figures, the thickness, ratio, and dimensions of components are exaggerated for clarity of illustration. The term "and/or" includes any and all combinations of one or more of the associated listed items.

It will be understood that although the terms such as 'first' and 'second' are used herein to describe various elements, these elements should not be limited by these terms. The terms are only used to distinguish one component from other components, and may not define order or sequence. For example, a first element referred to as a first element in one embodiment can be referred to as a second element in another exemplary embodiment without departing from the scope of the appended claims. The terms of a singular form can include plural forms unless referred to the contrary.

Further, "under", "below", "above", "upper", and the like are used for explaining relation association of components illustrated in the drawings. The terms can be a relative concept and described based on directions expressed in the drawings.

The meaning of 'include', 'has', or 'comprise' specifies a property, a fixed number, a step, an operation, an element, a component or a combination thereof, but does not exclude other properties, fixed numbers, steps, operations, elements, components or combinations thereof.

The term "exemplary" or "exemplarily" is used to mean an example, and is interchangeably used with the term "example". Further, embodiments are example embodiments and aspects are example aspects. Any implementation described herein as an "exemplary", "exemplarily" or "example" is not necessarily to be construed as preferred or advantageous over other implementations. Also, "embodiment" is "embodiment" of the disclosure or invention. Here, "disclosure" is referred to as a present disclosure or present invention.

Features of various embodiments of the disclosure can be partially or entirely coupled to or combined with each other and can be operated, linked, or driven together in various ways. Embodiments of the disclosure can be carried out independently from each other, or can be carried out together in co-dependent or related relationship. In one or more aspects, the components of each display apparatus or device according to various embodiments of the disclosure are operatively coupled and configured.

FIG. 1 is a schematic block diagram of a display apparatus according to an embodiment of the disclosure.

Referring to FIG. 1, a display device 10 includes a display panel 100 including a plurality of pixels P, a controller 200, a gate driver 300 for supplying a gate signal to each of the plurality of pixels P, a data driver 400 for supplying a data signal to each of the plurality of pixels P, and a power supply 500 for supplying driving power to each of the plurality of pixels P.

The display panel 100 includes a display area (or active area) AA (see FIG. 2) where the pixels P are located, and a non-display area (or non-active area) NA (see FIG. 2) which surrounds the display area AA and where the gate driver 300 and the data driver 400 are located. The non-display area NA can surround the display area AA completely or in part.

In the display panel 100, a plurality of gate lines GL and a plurality of data lines DL intersect each other, and each of the plurality of pixels P is connected to the gate line GL and the data line DL. In an example, each pixel P receives a gate signal from the gate driver 300 through the gate line GL, receives a data signal from the data driver 400 through the data lines DL, and receives a high-potential driving voltage EVDD and a low-potential driving voltage EVSS from the power supply 500.

Here, the gate line GL is used to supply a scan signal SC and an emission control signal EM, and the data line DL is used to supply a data voltage Vdata. Further, according to various embodiments, the gate lines GL can include a plurality of scan lines SCL to supply the scan signals SC, and an emission control signal line EML to supply the emission control signal EM. The plurality of pixels P can receive a bias voltage VOBS and an initialization voltage VAR or Vini through an additional power line VL.

Figure 2:
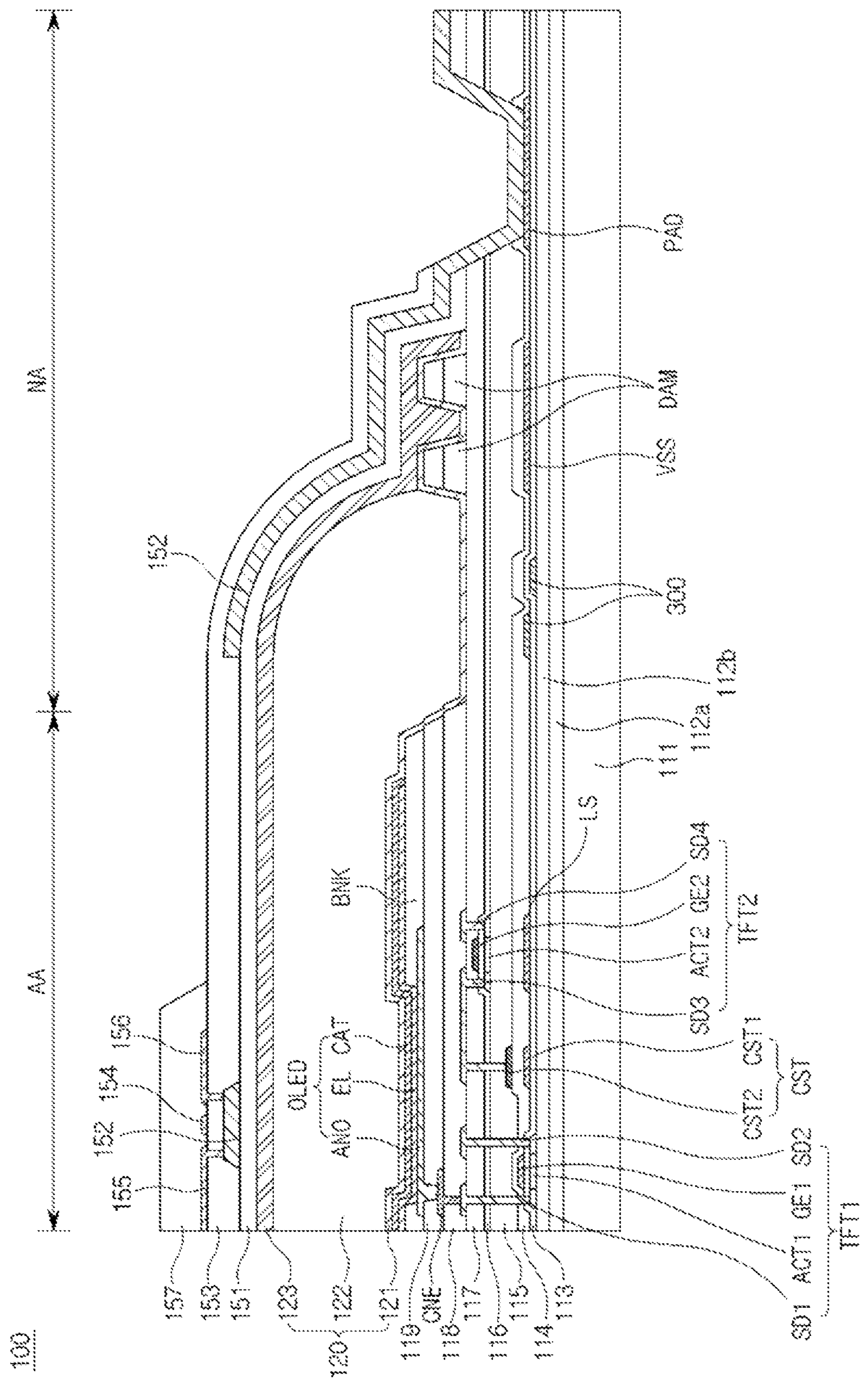
FIG. 2 is a cross-sectional view showing a stacked structure of a display device according to an embodiment of the disclosure.

Further, each pixel P, as shown in FIG. 2, includes a light emitting diode EL and a pixel circuit to control driving of the light emitting diode EL. Here, the light emitting diode EL includes an anode ANO, a cathode CAT, and an emissive layer EL disposed between the anode ANO and the cathode CAT.

The pixel circuit includes a plurality of switching elements, driving elements, and capacitors. Here, the switching element and the driving element can be implemented by thin film transistors. In the pixel circuit, the driving element controls the amount of current supplied to the light emitting diode EL according to data voltages, thereby adjusting the amount of light emitted from the light emitting diode EL. Further, the plurality of switching elements receives the scan signals SC supplied through the plurality of scan lines SCL and the emission control signal EM supplied through the emission control line EML, thereby operating the pixel circuit.

The display panel 100 can be implemented as a non-transmissive display panel or a transmissive display panel. The transmissive display panel can be applied to a transparent display device where an image is displayed on a screen and real objects are visible in the background. The display panel 100 can be made of a flexible display panel. The flexible display panel can be implemented as an organic light emitting diode (OLED) panel using a plastic substrate.

Each pixel P can be divided into a red pixel, a green pixel, and a blue pixel to reproduce colors. Each pixel P can further include a white pixel. Each pixel P includes a pixel circuit.

The display panel 100 can include touch sensors disposed thereon. A touch input can be detected through separate touch sensors or through the pixels P. The touch sensors can be implemented as on-cell or add-on type touch sensors disposed on the screen of the display panel, or as in-cell type touch sensors embedded in the display panel 100.

The controller 200 processes image data RGB received from the outside to be suitable for the size and resolution of the display panel 100, and supplies the processed data to the data driver 400. The controller 200 generates a gate control signal GCS and a data control signal DCS based on synchronization signals received from the outside, for example, a dot clock signal CLK, a data enable signal DE, a horizontal synchronization signal Hsync, and a vertical synchronization signal Vsync. By supplying the generated gate control signal GCS and the generated data control signal DCS to the gate driver 300 and the data driver 400, the gate driver 300 and the data driver 400 are controlled.

The controller 200 can be configured in combination with various processors, for example, a microprocessor, a mobile processor, an application processor, etc. according to devices to which it is mounted.

A host system can be one of a television (TV) system, a set-top box, a navigation system, a personal computer (PC), a home theater system, a mobile device, a wearable device, and a vehicle system.

The controller 200 can control operation timings of a display panel driver at a frame frequency of (input frame frequency Xi) Hz, which equals i times the input frame frequency, where "i" is a positive integer greater than 0. The input frame frequency is 60 Hz in the national television standards committee (NTSC) system, and can be 50 Hz in the phase-alternating line (PAL) system.

The controller 200 generates a signal so that the pixels P can be driven at various refresh rates. In other words, the controller 200 generates signals related to the driving so that the pixels P can be driven in a variable refresh rate (VRR) mode or switchable between a first refresh rate and a second refresh rate. For example, the controller 200 can drive the pixels P at various refresh rates by simply changing the rate of the clock signal, generating a synchronization signal to make a horizontal blank or a vertical blank, or driving the gate driver 300 in a mask method.

The controller 200 generates the gate control signal GCS for controlling the operation timing of the gate driver 300, and the data control signal DSC for controlling the operation timing of the data driver 400, based on the timing signals Vsync, Hsync, and DE received from the host system. The controller 200 control the operation timing of the display panel driver to synchronize the gate driver 300 and the data driver 400.

The voltage level of the gate control signal GCS output from the controller 200 is converted into a gate-on voltage VGL, VEL and a gate-off voltage VGH, VEH through a level shifter and then supplied to the gate driver 300. The level shifter converts the low level voltage of the gate control signal GCS into a gate low voltage VGL, and converts the high level voltage of the gate control signal GCS into a gate high voltage VGH. The gate control signal GCS includes a start pulse and a shift clock.

The gate driver 300 supplies the scan signal SC to the gate line GL based on the gate control signal GCS received from the controller 200. The gate driver 300 can be disposed at one side or opposite sides of the display panel 100 as a gate-in panel (GIP) type.

The gate driver 300 outputs the gate signals to the plurality of gate lines GL in sequence under the control of the controller 200. The gate driver 300 can shift the gate signal through a shift register, thereby sequentially supplying the signals to the gate lines GL.

The gate signal can include the scan signal SC and the emission control signal EM in the organic light-emitting display device. The scan signal SC includes a scan pulse that swings between the gate-on voltage VGL and the gate-off voltage VGH. The emission control signal EM can include an emission control signal pulse that swings between the gate-on voltage VEL and the gate-off voltage VEH.

The scan pulse is synchronized with the data voltage Vdata and selects the pixels P of a line in which data will be written. The emission control signal EM defines the emission time of the pixels P.

The gate driver 300 can include an emission control signal driver 310, and one or more scan drivers 320.

The emission control signal driver 310 outputs the emission control signal pulse in response to a start pulse and a shift clock from the controller 200, and sequentially shifts the emission control signal pulses in response to the shift clocks.

The one or more scan drivers 320 output the scan pulse in response to a start pulse and a shift clock from the controller 200, and shift the scan pulse according to the shift clock timing.

The data driver 400 converts the image data RGB into the data voltage Vdata based on the data control signal DCS supplied from the controller 200, and supplies the converted data voltage Vdata to the pixels P through the data lines DL.

FIG. 1 illustrates that one data driver 400 is disposed at one side of the display panel 100, but there are no limits to the number and position of data drivers 400.

In other words, the data driver 400 can include a plurality of integrated circuits (IC) and be disposed as divided in plural at one side of the display panel 100.

The power supply 500 employs a DC-DC converter to generate DC power necessary for driving a pixel array and a display panel driver of the display panel 100. The DC-DC converter can include a charge pump, a regulator, a buck converter, a boost converter, etc. The power supply 500 receives a DC input voltage from the host system and generate DC voltages such as the gate-on voltages VGL, VEL, the gate-off voltages VGH, VEH, the high-potential driving voltage EVDD, and the low-potential driving voltage EVSS. The gate-on voltage VGL, VEL and the gate-off voltages VGH, VEH are supplied to the level shifter and the gate driver 300. The high-potential driving voltage EVDD, and the low-potential driving voltage EVSS are supplied to the pixels P in common.

FIG. 2 is a cross-sectional view showing a stacked structure of a display device according to an embodiment.

Referring to FIG. 2, the cross-sectional view shows two switching thin film transistors TFT1 and TFT2 and one capacitor CST. The two thin film transistors TFT1 and TFT2 includes a thin film transistor of either a switching thin film transistor or a driving transistor, which contains a polycrystalline semiconductor material, and an oxide thin film transistor TFT2 which contains an oxide semiconductor material. In this case, the thin film transistor containing the polycrystalline semiconductor material will be called a polycrystalline thin film transistor TFT1, and the thin film transistor containing the oxide semiconductor material will be called the oxide the thin film transistor TFT2.

In FIG. 2, the polycrystalline thin film transistor TFT1 is an emission switching thin film transistor connected to the light emitting diode EL, and the oxide thin film transistor TFT2 is any one of switching thin film transistors connected to the capacitor CST.

Each pixel P includes the light emitting diode EL, and the pixel driving circuit for applying a driving current to the light emitting diode EL. The pixel driving circuit is disposed on a substrate 111, and the light emitting diode EL is disposed on the pixel driving circuit. In addition, an encapsulation layer 120 is disposed on the light emitting diode EL. The encapsulation layer 120 protects the light emitting diode EL.

The pixel driving circuit can refer to one pixel array that includes the driving thin film transistor, the switching thin film transistor, and the capacitor. In addition, the light emitting diode EL can refer to an array for light emission, which includes the anode, the cathode, and the light emitting layer disposed between the anode and the cathode.

According to an embodiment of the disclosure, the driving thin film transistor and at least one switching thin film transistor employ an oxide semiconductor as an active layer. The thin film transistor using the oxide semiconductor material as the active layer has an excellent leakage-current blocking effect and a relatively low manufacturing cost, compared to the thin film transistor using the polycrystalline semiconductor material as the active layer. Therefore, to reduce power consumption and lower manufacturing costs, the pixel driving circuit according to an embodiment of the disclosure includes the driving thin film transistor and at least one switching thin film transistor, which employ the oxide semiconductor material.

All the thin film transistors of the pixel driving circuit can be implemented using the oxide semiconductor material, or only some switching thin film transistors can be implemented using the oxide semiconductor material.

However, the reliability of the thin film transistor using the oxide semiconductor material can be difficult to secure, but the thin film transistor using the polycrystalline semiconductor material has fast operation speed and high reliability. Therefore, the pixel driving circuit according to an embodiment of the disclosure includes both the switching thin film transistor using the oxide semiconductor material and the switching thin film transistor using the polycrystalline semiconductor material.

The substrate 111 can be implemented as a multi-layer where an organic film and an inorganic film are alternately stacked. For example, an organic film of polyimide and an inorganic film of silicon oxide (SiO2) can be alternately stacked to form the substrate 111.

A lower buffer layer 112*a* is formed on the substrate 111. The lower buffer layer 112*a* is to block permeation of moisture, etc., from the outside. The lower buffer layer 112*a* can be formed by stacking films of silicon oxide (SiO2) or the like as a multi-layer. Further, an auxiliary buffer layer 112*b* can be additionally disposed on the lower buffer layer 112*a* to protect the elements from the permeation of moisture.

On the substrate 111, the polycrystalline thin film transistor TFT1 is formed. The polycrystalline thin film transistor TFT1 can employ a polycrystalline semiconductor as the active layer. The polycrystalline thin film transistor TFT1 includes a first active layer ACT1, a first gate electrode GE1, a first source electrode SD1, and a first drain electrode SD2, which include channels through which electrons or holes are transported.

The first active layer ACT1 includes a first channel area, a first source area disposed on one side across the first channel area, and a first drain area disposed on the other side.

The first source area and the first drain area refer to areas where an intrinsic polycrystalline semiconductor material is doped with pentavalent or trivalent impurity ions, for example, phosphorus (P) or boron (B), at predetermined concentrations to become conductive. The first channel area refers to an area where the polycrystalline semiconductor material remains intrinsic, thereby providing a pathway for transporting electrons or holes.

Meanwhile, the polycrystalline thin film transistor TFT1 includes the first gate electrode GE1 overlapping the first channel area of the first active layer ACT1. A first gate insulating layer 113 is disposed between the first gate electrode GE1 and the first active layer ACT1. The first gate insulating layer 113 can be formed by stacking a silicon oxide (SiO2) film, a silicon nitride (SiNx) or the like inorganic layer as a single or multiple layer.

According to an embodiment of the disclosure, the polycrystalline thin film transistor TFT1 has a top gate structure where the first gate electrode GE1 is positioned above the first active layer ACT1. Thus, a first electrode CST1 included in the capacitor CST and a light shielding layer LS included in the oxide thin film transistor TFT2 can be formed of the same material as the first gate electrode GE1. The first gate electrode GE1, the first electrode CST1, and the light shielding layer LS are formed through one mask process, thereby reducing the mask process.

The first gate electrode GE1 is made of a metal material. For example, the first gate electrode GE1 can be a single or multiple layers made of any one among, but not limited to, molybdenum (Mo), aluminum (Al), chromium (Cr), gold (Au), titanium (Ti), nickel (Ni), neodymium (Nd) and copper (Cu) or alloys thereof.

A first interlayer insulating layer 114 is disposed on the first gate electrode GE1. The first interlayer insulating layer 114 can contain silicon oxide (SiO2), silicon nitride (SiNx), etc.

The display panel 100 can further include an upper buffer layer 115, a second gate insulating layer 116, and a second interlayer insulating layer 117 which are disposed in sequence on the first interlayer insulating layer 114, and the polycrystalline thin film transistor TFT1 can be formed on the second interlayer insulating layer 117 and include the first source electrode SD1 and the first drain electrode SD2 respectively connected to the first source area and the first drain area.

Each of the first source electrode SD1 and the first drain electrode SD2 can be a single or multiple layer made of one among, but not limited to, molybdenum (Mo), aluminum (Al), chromium (Cr), gold (Au), titanium (Ti), nickel (Ni), neodymium (Nd), and copper (Cu), or alloys thereof.

The upper buffer layer 115 separates a second active layer ACT2 of the oxide thin film transistor TFT2 made of the oxide semiconductor material from the first active layer ACT1 made of the polycrystalline semiconductor material, and provides a base for forming the second active layer ACT2.

The second gate insulating layer 116 covers the second active layer ACT2 of the oxide thin film transistor TFT2. The second gate insulating layer 116 is made of an inorganic film because it is formed on the second active layer ACT2 made of the oxide semiconductor material. For example, the second gate insulating layer 116 can include silicon oxide (SiO2), silicon nitride (SiNx), etc.

The second gate electrode GE2 is made of a metal material. For example, the second gate electrode GE2 can be a single or multiple layer made of one among, but not limited to, molybdenum (Mo), aluminum (Al), chromium (Cr), gold (Au), titanium (Ti), nickel (Ni), neodymium (Nd), and copper (Cu) or alloys thereof.

Meanwhile, the oxide thin film transistor TFT2 is formed on the upper buffer layer 115, and includes the second active layer ACT2 made of the oxide semiconductor material, the second gate electrode GE2 disposed on the second gate insulating layer 116, a second source electrode SD3 and a second drain electrode SD4 disposed on the second interlayer insulating layer 117.

The second active layer ACT2 includes an intrinsic second channel area made of the oxide semiconductor material and not doped with impurities, and the second source area and the second drain area doped with impurities to become conductive.

The oxide thin film transistor TFT2 further includes a light shielding layer LS disposed below the upper buffer layer 115 and overlapping the second active layer ACT2. The light shielding layer LS shields light incident on the second active layer ACT2 and secures the reliability of the oxide thin film transistor TFT2. The light shielding layer LS can be made of the same material as the first gate electrode GE1 and formed on the upper surface of the first gate insulating layer 113. The light shielding layer LS can be electrically connected to the second gate electrode GE2 and form a dual gate.

The second source electrode SD3 and the second drain electrode SD4, together with the first source electrode SD1 and the first drain electrode SD2, are simultaneously formed as the same material on the second interlayer insulating layer 117, thereby reducing the number of mask processes.

The second electrode CST2 is disposed on the first interlayer insulating layer 114 to overlap the first electrode CST1, thereby forming the capacitor CST. The second electrode CST2 can be a single or multiple layer made of one among, for example, molybdenum (Mo), aluminum (Al), chromium (Cr), gold (Au), titanium (Ti), nickel (Ni), neodymium (Nd), and copper (Cu) or alloys thereof.

The capacitor CST stores the data voltage applied through the data lines DL for a certain period of time and provides the stored data voltage to the light emitting diode EL. The capacitor CST includes two electrodes corresponding to each other and a dielectric disposed between the two electrodes. Between the first electrode CST1 and the second electrode CST2, the first interlayer insulating layer 114 is disposed.

The first electrode CST1 or the second electrode CST2 of the capacitor CST can be electrically connected to the second source electrode SD3 or the second drain electrode SD4 of the oxide thin film transistor TFT2. However, without limitation, such a connection in the capacitor can be varied depending on the pixel driving circuit.

Further, a first planarization layer 118 and a second planarization layer 119 are disposed in sequence on the pixel driving circuit to planarize the top of the pixel driving circuit. The first planarization layer 118 and the second planarization layer 119 can be an organic film such as polyimide or acryl resin.

In addition, the light emitting diode EL is formed on the second planarization layer 119.

The light emitting diode EL includes the anode ANO, the cathode CAT, and the emissive layer EL disposed between the anode ANO and the cathode CAT. When a pixel driving circuit is implemented to use a low potential voltage connected to the cathode CAT in common, the anode ANO is disposed as a separate electrode for each sub-pixel. On the other hand, when a pixel driving circuit is implemented to use a high potential voltage in common, the cathode CAT can be disposed as a separate electrode for each sub-pixel.

The light emitting layer EL can further comprise a light emitting material layer, a first electrolytic layer located between the anode ANO and the light emitting material layer, and a second electrolytic layer located between the light emitting material layer and the cathode CAT. The first electrolyte layer is located between the anode ANO and the light emitting material layer. The first electrolyte layer can further include a hole injection layer HIL located adjacent to the anode ANO between the anode ANO and the electrolyte layer, and a hole transport layer HTL located adjacent to the electrolyte layer between the anode ANO and the electrolyte layer.

The second electrolytic layer 160 is located between the emissive material layer and the cathode CAT. In this embodiment, the second electrolytic layer 160 can be an electron transport layer that supplies electrons to the light emitting material layer. In one exemplary embodiment, the second electrolytic layer 160 includes an electron injection layer EIL located adjacent to the cathode CAT between the cathode CAT and the light emitting material layer, and an electron transport layer ETL located adjacent to the light emitting material layer between the cathode CAT and the light emitting material layer. Meanwhile, the first electron transport layer and the second electron transport layer of the light emitting layer EL can be disposed extending without distinction to the red the pixel, the green the pixel, and the blue pixel described in FIG. 1. In particular, the hole transport layer HTL of the first electrolytic layer can have a smaller resistance at high temperatures.

The light emitting diode EL is electrically connected to the driving element through an intermediate electrode CNE disposed on the first planarization layer 118. Specifically, the anode ANO of the light emitting diode EL and the first source electrode SD1 of the polycrystalline thin film transistor TFT1 forming the pixel driving circuit are connected to each other by the intermediate electrode CNE.

The anode ANO is connected to the intermediate electrode CNE exposed through a contact hole formed penetrating the second planarization layer 119. Further, the intermediate electrode CNE is connected to the first source electrode SD1 exposed through the contact hole formed penetrating the first planarization layer 118.

The intermediate electrode CNE serves as a medium connecting the first source electrode SD1 and the anode ANO. The intermediate electrode CNE can be formed of a conductive material such as copper (Cu), silver (Ag), molybdenum (Mo), and titanium (Ti).

The anode ANO can be formed as a multilayered structure that includes a transparent conductive film and an opaque conductive film having a high reflective efficiency. The transparent conductive film can be made of indium-tin-oxide (ITO), indium-zinc-oxide (IZO) or the like material having a relatively large work function, and the opaque conductive film can be structured to have a single or multiple layer made of aluminum (Al), silver (Ag), copper (Cu), lead (Pb), molybdenum (Mo), titanium (Ti) or alloys thereof. For example, the anode ANO can be formed to have a structure where the transparent conductive film, the opaque conductive film, and the transparent conductive film are stacked in sequence, or a structure where the transparent conductive film and the opaque conductive film are stacked in sequence.

The emissive layer EL is formed by stacking a hole-related layer, an organic light emitting layer, and an electron-related layer on the anode ANO in sequence or in reverse sequence.

A bank layer BNK can be a pixel defining layer that exposes the anode ANO of each pixel P. The bank layer BNK can be formed of an opaque material (e.g., black) to prevent optical interference between adjacent pixels P. In this case, the bank layer BNK can be made of a light blocking material that includes at least one of a color pigment, organic blank, and carbon. A spacer 700 can be further disposed on the bank layer BNK.

The cathode CAT is formed on the top and lateral surfaces of the emissive layer EL while facing the anode ANO with the emissive layer EL therebetween. The cathode CAT can be formed as a single body throughout the display area AA. When the cathode CAT is applied to a front-emissive organic light emitting display device, the cathode CAT can be made of indium-tin-oxide (ITO), indium-zinc-oxide (IZO) or the like transparent conductive film.

On the cathode CAT, the encapsulation layer 120 can be further disposed to suppress permeation of moisture.

The encapsulation layer 120 prevents external water or oxygen from permeating the light-emitting diode EL vulnerable to water or oxygen. To this end, the encapsulation layer 120 includes, but is not limited to, at least one inorganic encapsulation layer, and at least one organic encapsulation layer. According to the disclosure, it will be described by way of example that the encapsulation layer 120 has a structure where a first encapsulation layer 121, a second encapsulation layer 122, and a third encapsulation layer 123 are stacked in sequence.

The first encapsulation layer 121 is formed on the substrate 111 formed with the cathode CAT. The third encapsulation layer 123 is formed on the substrate 111 formed with the second encapsulation layer 122, and formed to, together with the first encapsulation layer 121, surround the top, bottom and lateral sides of the second encapsulation layer 122. The first encapsulation layer 121 and the third encapsulation layer 123 can minimize or prevent the permeation of external water or oxygen into the light-emitting diode EL. The first encapsulation layer 121 and the third encapsulation layer 123 can be formed of inorganic insulating materials such as silicon nitride (SiNx), silicon oxide (SiOx), silicon oxynitride (SiON) or aluminum oxide (Al2O3) which can be deposited at a low temperature. Because the first encapsulation layer 121 and the third encapsulation layer 123 are deposited at a low temperature atmosphere, the light-emitting diode EL vulnerable to high temperature atmosphere is prevented from being damaged when the first encapsulation layer 121 and the third encapsulation layer 123 are subjected to a deposition process.

The second encapsulation layer 122 serves as a buffer to relieve stress between the layers due to bending of the display device 10, and levels out a stepped portion between the layers. The second encapsulation layer 122 can be formed of a non-photosensitive inorganic insulating material such as acryl resin, epoxy resin, phenolic resin, polyamide resin, polyimide resin and polyethylene or silicon oxycarbide (SiOC) or a photosensitive inorganic insulating material such as photo-acryl on the substrate 711 formed with the first encapsulation layer 121, but not limited thereto. When the second encapsulation layer 122 is formed by an inkjet method, a dam DAM can be disposed to prevent the second encapsulation layer 122 in a liquid state from spreading over to the edges of the substrate 111. The dam DAM can be disposed closer to the edge of the substrate 111 than the second encapsulation layer 122. By the dam DAM, the second encapsulation layer 122 is prevented from spreading to a pad area where a conductive pad disposed at the outmost edge of the substrate 111 is disposed.

The dam DAM is designed to prevent the second encapsulation layer 122 from spreading. However, if the second encapsulation layer 122 is formed beyond the height of the dam DAM during the process, the organic layer, i.e., the second encapsulation layer 122 can be exposed to the outside so that water or the like can easily permeate into the light-emitting diode. Therefore, to prevent this, at least ten dams DAM can be formed to be duplicated.

The dam DAM can be disposed on the second interlayer insulating layer 117 of the non-display area NA.

Further, the dam DAM can be formed simultaneously with the first planarization layer 118 and the second planarization layer 119. A lower layer of the dam DAM can be formed together when the first planarization layer 118 is formed, and an upper layer of the dam DAM can be formed together when the second planarization layer 119 is formed.

Therefore, the dam DAM can be made of the same material as the first planarization layer 118 and the second planarization layer 119, but not limited thereto.

The dam DAM can be formed overlapping a low-potential driving power line VSS. For example, the low-potential driving power line VSS can be formed as a layer under an area where the dam DAM is positioned within the non-display area NA.

The low-potential driving power line VSS and the gate driver 300 formed as a gate in panel (GIP) can be formed to surround the periphery of the display panel, and the low-potential driving power line VSS can be positioned further outside than the gate driver 300. Further, the low-potential driving power line VSS is connected to the cathode CAT to supply a common voltage. The gate driver 300 is simply illustrated in the plan view and the cross-sectional view, but can be configured with the thin film transistor having the same structure as the thin film transistor of the display area AA.

The low-potential driving power line VSS is disposed further outside than the gate driver 300. The low-potential driving power line VSS is disposed outside the gate driver 300, and surrounds the display area AA. For example, the low-potential driving power line VSS can be made of the same material as the first gate electrode GE1, but not limited thereto. Alternatively. The low-potential driving power line VSS can be made of the same material as the second electrode CST2 or the first source and drain electrodes SD1 and SD2.

Further, the low-potential driving power line VSS can be electrically connected to the cathode CAT. The low-potential driving power line VSS can supply a low-potential driving voltage EVSS to the plurality of pixels P within the display area AA.

A touch layer can be disposed on the encapsulation layer 120. In the touch layer, a touch buffer layer 151 can be positioned between the cathode CAT of the light-emitting diode EL and a touch sensor metal including touch electrode connection lines 152 and 154 and touch electrodes 155 and 156.

The touch buffer layer 151 can block permeation of a chemical solution (e.g., a development solution or an etching solution) used in a process of fabricating the touch sensor metal disposed on the touch buffer layer 151, water from the outside, etc., into the light-emitting layer EL including the organic material. Thus, the touch buffer layer 151 prevents the light-emitting layer EL vulnerable to the chemical solution or water from being damaged.

The touch buffer layer 151 is formed of an organic insulating material, which can be formed at a low temperature below a certain temperature (e.g., 100 degrees Celsius (C)) and has a low dielectric constant of 1 to 3, to prevent the light-emitting layer EL including an organic material vulnerable to high temperature from being damaged. For example, the touch buffer layer 151 can be formed of an acrylic-based, epoxy-based, or siloxane-based material. The touch buffer layer 151, which is an organic insulating material and has planarization performance, can prevent the encapsulation layer 120 from being damaged and the touch sensor metal formed on the touch buffer layer 151 from being broken due to the bending of the organic light-emitting display device.

In the touch sensor structure based on mutual capacitance, the touch electrodes 155 and 156 can be disposed on the touch buffer layer 151, and the touch electrodes 155 and 156 can be disposed to intersect each other.

The touch electrode connection lines 152 and 154 can electrically connect the touch electrodes 155 and 156. The touch electrode connection lines 152 and 154 and the touch electrodes 155 and 156 can be positioned at different layers with a touch insulating film 153 therebetween.

The touch electrode connection lines 152 and 154 are disposed to overlap the bank layer 165 and prevent an aperture from being lowered.

In the touch electrodes 155 and 156, a part of the touch electrode connection line 152 can be electrically connected to a touch driving circuit through a touch pad PAD via the top and lateral side of the encapsulation layer 120 and the top and lateral side of the dam DAM.

The part of the touch electrode connection line 152 can receive a touch driving signal from a touch driving circuit and transmit the touch driving signal to the touch electrodes 155 and 156, and can also transmit a touch sensing signal from the touch electrodes 155 and 156 to the touch driving circuit.

A touch protection film 157 can be disposed on the touch electrodes 155 and 156. In the accompanying drawings, the touch protection film 157 is disposed only the touch electrodes 155 and 156, but not limited thereto. Alternatively, the touch protection film 157 can also be disposed on the touch electrode connection line 152 as extended even to the front or rear of the dam DAM.

In addition, a color filter can further be disposed on the encapsulation layer 120. Alternatively, the color filter can be positioned on the touch layer, or can also be positioned between the encapsulation layer 120 and the touch layer.

Figure 3:
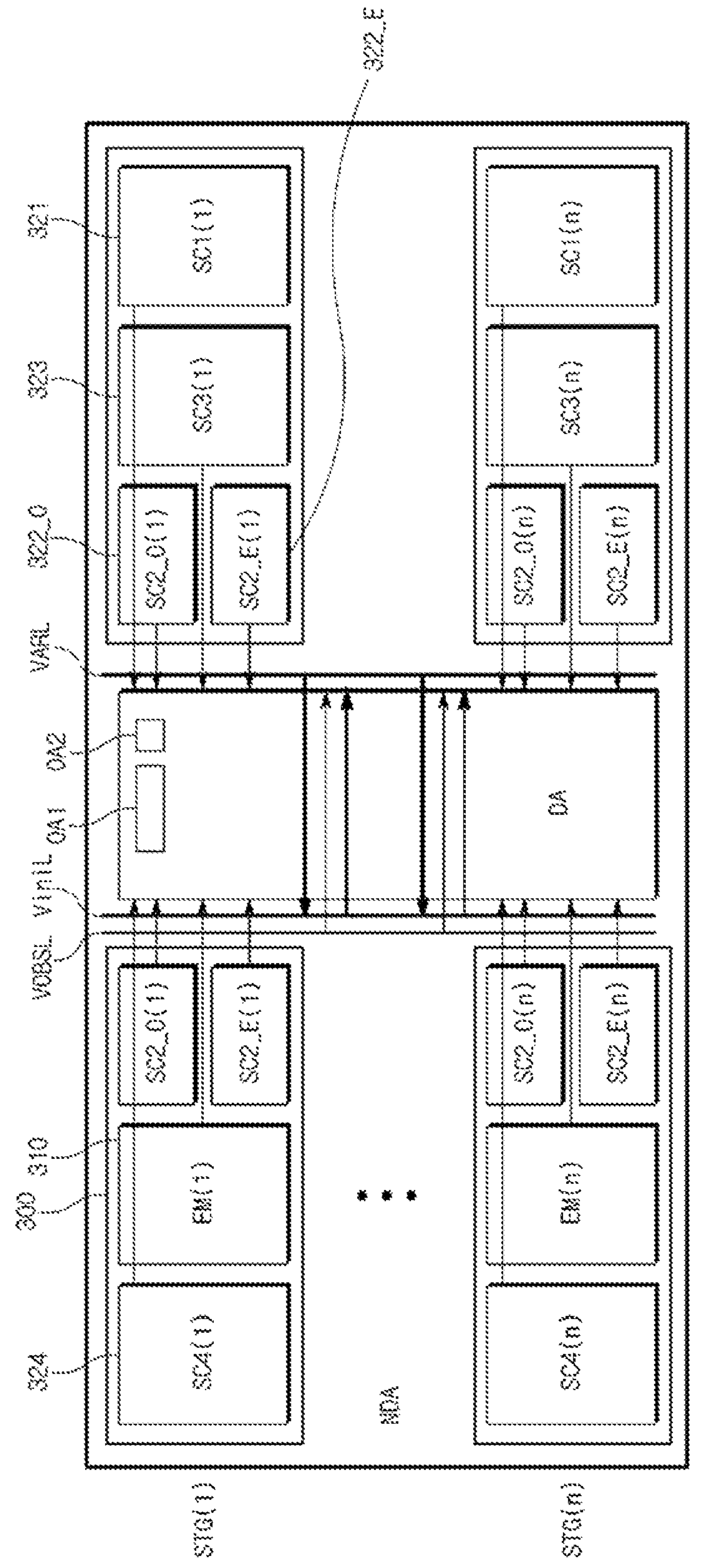
FIG. 3 is a diagram showing a configuration of a gate driver in a display device according to an embodiment of the disclosure.

FIG. 3 is a diagram showing a configuration of a gate driver in a display device according to an embodiment of the disclosure.

Referring to FIG. 3, the gate driver 300 includes the emission control signal driver 310, and the scan driver 320. The scan driver 320 can include first to fourth scan drivers 321, 322, 323 and 324. Further, the second scan driver 322 can include an odd-numbered second scan driver 322_O and the even-numbered second scan driver 322_E.

The gate driver 300 can include shift registers symmetrically provided at the opposite sides of the display area AA. Further, the gate driver 300 can be configured such that the shift register at one side of the display area AA includes a second scan drivers 322_O and 322_E, a fourth scan driver 324, and the emission control signal driver 310, and the shift register at the other side of the display area AA includes a first scan driver 321, the second scan drivers 322_O and 322_E, and the third scan driver 323. However, without limitation, the emission control signal driver 310 and the first to fourth scan drivers 321, 322, 323 and 324 can be arranged variously according to embodiments.

Each of stages STG1 to STGn of the shift register can include first scan signal generators SC1(1) to SC1(*n*), second scan signal generators SC2_O(1) to SC2_O(n) and SC2_E(1) to SC2_E(n), third scan signal generators SC3(1) to SC3(*n*), fourth scan signal generators SC4(1) to SC4(*n*), and emission control signal generators EM(1) to EM(n), where n is a positive number such as an integer greater than 1.

The first scan signal generators SC1(1) to SC1(*n*) output first scan signals SC1(1) to SC1(*n*) through the first scan lines SCL1 of the display panel 100. The second scan signal generators SC2(1) to SC2(*n*) output second scan signals SC2(1) to SC2(*n*) through the second scan lines SCL2 of the display panel 100. The third scan signal generators SC3(1) to SC3(*n*) output third scan signals SC3(1) to SC3(*n*) through third scan lines SCL3 of the display panel 100. The fourth scan signal generators SC4(1) to SC4(*n*) output fourth scan signals SC4(1) to SC4(*n*) through the fourth scan lines SCL4 of the display panel 100. The emission control signal generators EM(1) to EM(n) output emission control signals EM(1) to EM(n) through the emission control lines EML of the display panel 100.

The first scan signals SC1(1) to SC1(*n*) can be used as signals for driving an A transistor (for example, a compensation transistor, etc.) included in the pixel circuit. The second scan signals SC2(1) to SC2(*n*) can be used as signals for driving a B transistor (for example, a data supplying transistor, etc.) included in the pixel circuit. The third scan signals SC3(1) to SC3(*n*) can be used as signals for driving a C transistor (for example, a bias transistor, etc.) included in the pixel circuit. The fourth scan signals SC4(1) to SC4(*n*) can be used as signals for driving a D transistor (for example, an initialization transistor, etc.) included in the pixel circuit. The emission control signals EM(1) to EM(n) can be used as signals for driving an E transistor (for example, an emission control transistor, etc.) included in the pixel circuit. For example, when the emission control signals EM(1) to EM(n) are used to control the emission control transistor of the pixels, the light emission time of the light emitting diode is changed.

Referring to FIG. 3, a bias voltage bus line VOBSL, a first initialization voltage bus line VarL, and a second initialization voltage bus line ViniL can be disposed between the gate driver 300 and the display area AA.

The bias voltage bus line VOBSL, the first initialization voltage bus line VarL, and the second initialization voltage bus line ViniL can be used to supply the bias voltage VOBS, the first initialization voltage VAR, and the second initialization voltage Vini from the power supply 500 to the pixel circuit.

Particularly, FIG. 3 illustrates that the bias voltage bus line VOBSL, the first initialization voltage bus line VarL, and the second initialization voltage bus line ViniL are located on, but not limited thereto, only the left or right side of the display area AA, but can be located on both sides. Although they are located on one side, there are no limits to their location on the left or right side.

One or more optical areas OA1 and OA2 can be disposed in the display area AA.

One or more optical areas OA1 and OA2 can be arranged to overlap an imaging device such as a camera (or an image sensor), a detection sensor such as a proximity sensor and an illumination sensor, or the like one or more optical electronic devices.

One or more optical areas OA1 and OA2 can have a light transmission structure with a transmittance higher than or equal to a certain level to operate the optical electronic device. In other words, the number of pixels P per unit area in one or more optical areas OA1 and OA2 can be smaller than the number of pixels P per unit area of a normal area excluding the optical areas OA1 and OA2 from the display area AA. In other words, one or more optical areas OA1 and OA2 can have a lower resolution than the normal area of the display area AA.

In one or more optical areas OA1 and OA2, the light transmission structure can be formed by patterning the cathode in a portion where no pixels P are arranged. In this case, the cathode can be patterned using a laser, or a cathode deposition preventing layer or the like material can be used to selectively form and pattern the cathode.

Further, in one or more optical areas OA1 and OA2, the light transmission structure can be formed by separately forming the light emitting diode EL and the pixel circuit in the pixel P. In other words, the light emitting diode EL of the pixel P can be located on the optical areas OA1 and OA2, and a plurality of transistors TFT forming the pixel circuit can be disposed on the periphery of the optical areas OA1 and OA2 such that the light emitting diode EL and the pixel circuit are electrically connected through a transparent metal layer.

Figure 4:
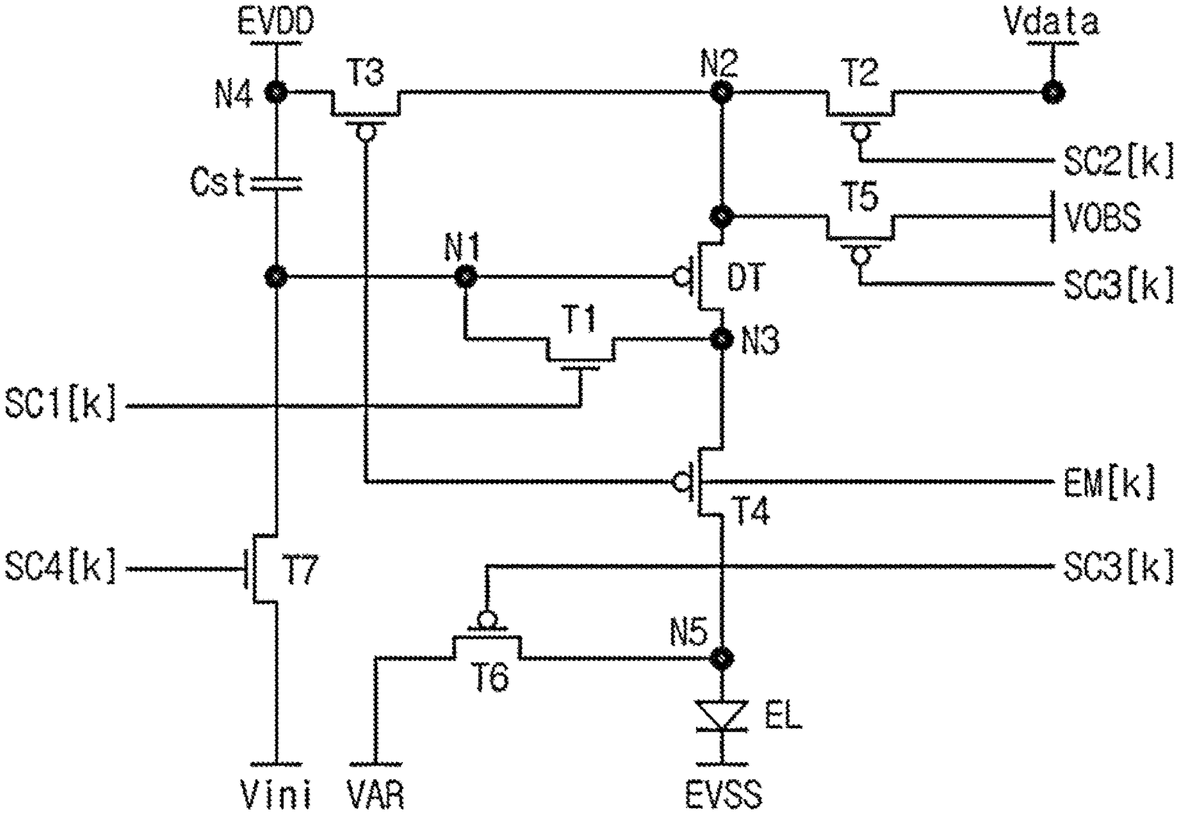
FIG. 4 is a diagram of a pixel circuit in a display device according to an embodiment of the disclosure.

FIG. 4 is a diagram of a pixel circuit in a display device according to an embodiment of the disclosure.

Particularly, FIG. 4 shows a pixel circuit for illustrative purposes only, and its structure is not limited as long as an emission signal EM(n) is applied to control the emission of the light emitting diode EL. For example, the pixel circuit can include an additional scan signal, a switching thin film transistor connected to the additional scan signal, and a switching thin film transistor to which an additional initialization voltage is applied, in which various connection relationships of a switching element or various connection positions of a capacitor are possible. Below, for convenience of description, a display device with the pixel circuit structure of FIG. 4 will be described.

Referring to FIG. 4, each of the plurality of pixels P can include a pixel circuit having a driving transistor DT, and a light emitting diode EL connected to the pixel circuit.

The pixel circuit can drive the light emitting diode EL by controlling a driving current flowing in the light emitting diode EL. The pixel circuit can include the driving transistor DT, the first to seventh transistors T1 to T7, and a capacitor Cst. Each of the transistors DT, T1 to T7 can include a first electrode, a second electrode, and a gate electrode. One of the first electrode and the second electrode can be a source electrode, and the other one of the first electrode and the second electrode can be a drain electrode.

Each of the transistors DT, T1 to T7 can be a P-type thin film transistor or an N type thin film transistor. In the embodiment of FIG. 3, the first transistor T1 and the seventh transistor T7 are the N type thin film transistors, and the other transistors DT, T2 to T6 are the P type thin film transistor. However, without limitation, all or some of the transistors DT, T1 to T7 according to an embodiment can be the P type thin film transistor or the N type thin film transistor. Further, the N type thin film transistor can be an oxide thin film transistor, and the P type thin film transistor can be a polycrystalline silicon thin film transistor.

Below, descriptions will be made under the condition that the first transistor T1 and the seventh transistor T7 are the N type thin film transistor, and the other transistors DT, T2 to T6 are the P type thin film transistor. Therefore, the first transistor T1 and the seventh transistor T7 are turned on by a high voltage, and the other transistors DT, T2 to T6 are turned on by a low voltage.

For example, the first transistor T1 of the pixel circuit can function as a compensation transistor, the second transistor T2 can function as a data supply transistor, the third and fourth transistors T3 and T4 can function as an emission control transistor, the fifth transistor T5 can function as a bias transistor, and the sixth and seventh transistors T6 and T7 can function as an initialization transistor.

The light emitting diode EL can include an anode and a cathode. The anode of the light emitting diode EL can be connected to a fifth node N5, and the cathode can be connected to a low-potential driving voltage EVSS.

The driving transistor DT can include a first electrode connected to a second node N2, a second electrode connected to a third node N3, and a gate electrode connected to the first node N1. The driving transistor DT can provide a driving current Id to the light emitting diode EL based on the voltage of the first node N1 (or a data voltage stored in the capacitor Cst (to be described later)).

The first transistor T1 can include a first electrode connected to the first node N1, a second electrode connected to the third node N3, and a gate electrode receiving the first scan signal SC1(*k*). The first transistor T1 is turned on in response to the first scan signal SC1(*k*), and diode-connected between the first node N1 and the third node N3, thereby sampling a threshold voltage Vth of the driving transistor DT. The first transistor T1 can be the compensation transistor.

The capacitor Cst can be connected or formed between the first node N1 and a fourth node N4. The capacitor Cst can store or maintain the high-potential driving voltage EVDD.

The second transistor T2 can include a first electrode connected to the data lines DL (or receiving the data voltage Vdata), a second electrode connected to the second node N2, and a gate electrode receiving the second scan signal SC2(*k*). The second transistor T2 can be turned on in response to the second scan signal SC2(*k*), and transmit the data voltage Vdata to the second node N2. The second transistor T2 can be the data supply transistor.

The third transistor T3 and the fourth transistor T4 (or the first and second emission control transistors) can be connected between the high-potential driving voltage EVDD and the light emitting diode EL, and form a current moving pathway through which the driving current Id generated by the driving transistor DT moves.

The third transistor T3 can include a first electrode connected to the fourth node N4 and receiving the high-potential driving voltage EVDD, a second electrode connected to the second node N2, and a gate electrode receiving the emission control signal EM(k).

The fourth transistor T4 can include a first electrode connected to the third node N3, a second electrode connected to the fifth node N5 (or the anode of the light emitting diode EL), and a gate electrode receiving the emission control signal EM(k).

The third and fourth transistors T3 and T4 are turned on in response to the emission control signal EM(k), and in this case, the driving current Id is provided to the light emitting diode EL, so that the light emitting diode EL can emit light with brightness corresponding to the driving current Id.

The fifth transistor T5 can include a first electrode receiving the bias voltage VOBS, a second electrode connected to the second node N2, and a gate electrode receiving the third scan signal SC3(*n*). The fifth transistor T5 can be the bias transistor.

The sixth transistor T6 can include a first electrode receiving the first initialization voltage VAR, a second electrode connected to the fifth node N5, and a gate electrode receiving the third scan signal SC3(*k*).

The sixth transistor T6 can be turned on in response to the third scan signal SC3(*k*) before the light emitting diode EL emits light (or after the light emitting diode EL emits light), and initialize the anode (or the pixel electrode) of the light emitting diode EL based on the first initialization voltage VAR. The light emitting diode EL can include a parasitic capacitor formed between the anode and the cathode. While the light emitting diode EL is emitting light, the parasitic capacitor can be charged and a specific voltage can be applied to the anode of the light emitting diode EL. Therefore, the first initialization voltage VAR is applied to the anode of the light emitting diode EL through the sixth transistor T6, thereby initializing the amount of charges accumulated in the light emitting diode EL.

In this disclosure, the gate electrodes of the fifth and sixth transistors T5 and T6 are configured to receive the third scan signal SC3(*k*) in common. However, without limitation, the gate electrodes of the fifth and sixth transistors T5 and T6 can be configured to receive separate scan signals and be controlled independently of each other.

The seventh transistor T7 can include a first electrode receiving the second initialization voltage Vini, a second electrode connected to the first node N1, and a gate electrode receiving the fourth scan signal SC4(*k*).

The seventh transistor T7 is turned on in response to the fourth scan signal SC4(*k*), and initializes the gate electrode of the driving transistor DT by the second initialization voltage Vini. The gate electrode of the driving transistor DT can retain unnecessary charges due to the high-potential driving voltage EVDD stored in the capacitor Cst. Therefore, the second initialization voltage Vini is applied to the gate electrode of the driving transistor DT through the seventh transistor T7, thereby initializing the amount of remaining currents.

Figure 5A:
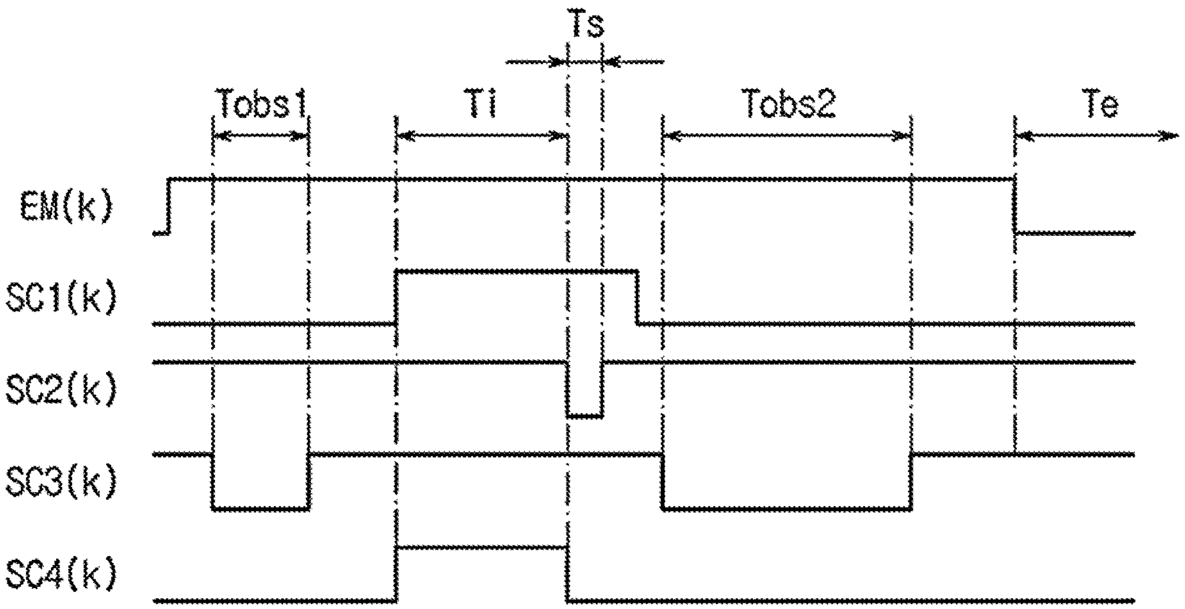
FIGS. 5A and 5B are views showing operations of a scan signal and an emission control signal in the pixel circuit shown in FIG. 4 during a refresh period and a hold period.
Figure 5B:
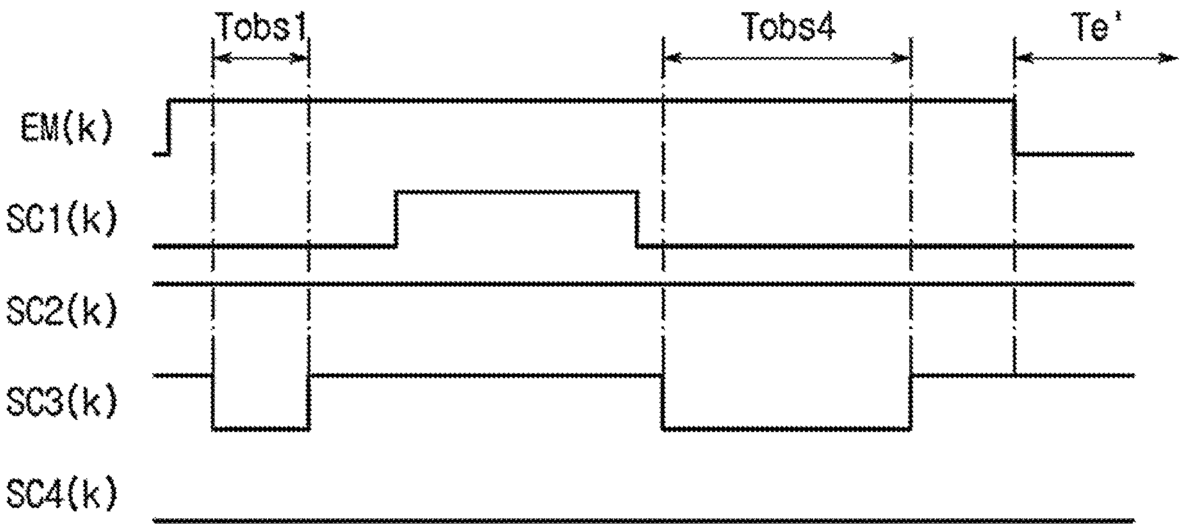

FIGS. 5A and 5B are views showing operations of a scan signal and an emission control signal in the pixel circuit shown in FIG. 4 during a refresh period and a hold period.

According to an embodiment of the disclosure, the display device can operate in a variable refresh rate (VRR) mode. In the VRR mode, the pixels can operate at a constant frequency, operate by increasing the refresh rate for updating the data voltage Vdata at a point in time when high speed driving is required, or operate by decreasing the refresh rate at a point in time when low power consumption or low speed driving is required.

Each of the plurality of pixels P can be driven by a combination of a refresh frame and a hold frame within one second. In this disclosure, one set is defined as a combination of a refresh period during which the data voltage Vdata is updated and a hold period during which the data voltage Vdata is not updated is repeated for one second. In addition, the period of one set is a cycle in which the combination of the refresh period and the hold period is repeated.

In the case of a refresh rate of 120 Hz, only the refresh period is used. In other words, 120 refresh periods are arranged within one second. In this case, one refresh period is 1/120=8.33 ms, and the period of one set is also 8.33 ms.

In the case of a refresh rate of 60 Hz, the refresh period and the hold period are alternately used. In other words, 60 refresh periods and 60 hold periods are alternately arranged within one second. In this case, each of one refresh period and one hold period is 0.5/60=8.33 ms, and the period of one set is 16.66 ms.

In the case of a refresh rate of 1 Hz, one frame can be driven with one refresh period and 119 hold periods following the one refresh period. Further, in the case of a refresh rate of 1 Hz, one frame can be driven with a plurality of refresh periods and a plurality of hold periods. In this case, each of one refresh period and one hold period is 1/120=8.33 ms, and the period of one set is 1 s.

During the refresh period, a new data voltage Vdata is charged and thus applied to the driving transistor DT. On the other hand, during the hold period, data voltage Vdata of a previous frame is retained as it is and used. Meanwhile, the hold period is also referred to as a skip period in the sense that a process of applying the new data voltage Vdata to the driving transistor DT is omitted.

Each of the plurality of pixels P can initialize the voltage charged or retained in the pixel circuit during the refresh period. Specifically, during the refresh period, each of the plurality of pixels P can remove the influence of the data voltage Vdata and the high-potential driving voltage EVDD stored in the previous frame. Therefore, during the hold period, each of the plurality of pixels P can display an image corresponding to the new data voltage Vdata.

During the hold period, each of the plurality of pixels P can provide a driving current corresponding to the data voltage Vdata to the light emitting diode EL, thereby displaying an image and maintaining the light emitting diode EL turned on.

First, it will be described with reference to FIG. 5A that the pixel circuit and the light emitting diode are driven during the refresh period. The refresh period can include at least one bias section Tobs1, Tobs2, an initialization section Ti, a sampling section Ts, and a light-emitting section Te. This is merely an embodiment of the disclosure, and there are no limits to the foregoing order of sections.

Referring to FIG. 5A, the pixel circuit can operate during the refresh period including at least one bias section Tobs1, Tobs2.

The at least one bias section Tobs1, Tobs2 refers to a section where an on-bias stress OBS operation for applying a bias voltage VOBS is performed, the emission control signal EM(n) is a high voltage, and the third and fourth transistors T3 and T4 are turned off. The first scan signal SC1(*k*) and the fourth scan signal SC4(*k*) are low voltages, and the first transistors T1 and the seventh transistor T7 are turned off. The second scan signal SC2 is a high voltage, and the second transistor T2 is turned off. Here, k is a positive number such as an integer greater than 1.

The third scan signal SC3(*k*) is input having the low voltage, and the fifth and sixth transistors T5 and T6 are turned on. As the fifth transistor T5 is turned on, the bias voltage VOBS is applied to the first electrode of the driving transistor DT connected to the second node N2.

Here, the bias voltage VOBS is supplied to the drain electrode, i.e., the third node N3 of the driving transistor DT, thereby decreasing a charging time or charging delay of voltage in the fifth node N5, i.e., the anode of the light emitting diode EL during the emission period. The driving transistor DT maintains a stronger saturation state.

For example, as the bias voltage VOBS increases, the voltage at the third node N3, i.e., the drain electrode of the driving transistor DT can increase but the gate-source voltage or the drain-source voltage of the driving transistor DT can decrease. Therefore, the bias voltage VOBS can be at least greater than the data voltage Vdata.

In this case, the level of the drain-source current Id flowing in the driving transistor DT can be decreased, and the stress of the driving transistor DT can be decreased under a positive bias stress condition, thereby eliminating the charging delay of the voltage at the third node N3. In other words, the on-bias stress (OBS) operation is performed before sampling the threshold voltage Vth of the driving transistor DT, thereby alleviating the hysteresis of the driving transistor DT.

Therefore, the on-bias stress (OBS) operation in the at least one bias section Tobs1, Tobs2 can be defined as an operation of directly applying a suitable bias voltage to the driving transistor DT during the non-emission periods.

Further, the sixth transistor T6 is turned on in the at least one bias section Tobs1, Tobs2, and thus the anode (or the pixel electrode) of the light emitting diode EL connected to the fifth node N5 is initialized with the first initialization voltage VAR.

However, the gate electrodes of the fifth and sixth transistors T5 and T6 can be configured to be controlled independently of each other by receiving separate scan signals. In other words, it is not necessary to simultaneously apply the bias voltage to the first electrode of the driving transistor DT and the anode of the light emitting diode EL during the bias section.

Referring to FIG. 5A, the pixel circuit can operate during the refresh period including the initialization section Ti. The initialization section Ti refers to a section for initializing the voltage of the gate electrode of the driving transistor DT.

The first to fourth scan signals SC1(*k*) to SC4(*k*) and the emission control signal EM(k) are high voltages, and the first transistor T1 and the seventh transistor T7 are turned on. The second to sixth transistors T2, T3, T4, T5 and T6 are turned off. As the first and seventh transistors T1 and T7 are turned on, the gate electrode and the second electrode of the driving transistor DT connected to the first node N1 are initialized with a second initialization voltage Vini.

Referring to FIG. 5A, the pixel circuit can operate during the refresh period including the sampling section Ts. The sampling section refers to a section for sampling the threshold voltage Vth of the driving transistor DT.

The first scan signal SC1(*k*), the third scan signal SC3(*k*), and the emission control signal EM(k) are high voltages, and the second scan signal SC2(*k*) and the fourth scan signal SC4(*k*) are low voltages. Thus, the third to seventh transistors T3, T4, T5, T6 and T7 are turned off, the first transistor T1 is maintained turned on, and the second transistor T2 is turned on. In other words, the second transistor T2 is turned on to apply the data voltage Vdata to the driving transistor DT, and the first transistor T1 is diode-connected between the first node N1 and the third node N3 to sample the threshold voltage Vth of the driving transistor DT.

Referring to FIG. 5A, the pixel circuit can operate during the refresh period including the light-emitting section Te. The light-emitting section Te refers to a section of offsetting the sampled threshold voltage Vth and making the light emitting diode EL emit light with the driving current corresponding to the sampled data voltage.

The emission control signal EM(k) is a low voltage, and the third and fourth transistors T3 and T4 are turned on.

As the third transistor T3 is turned on, the high-potential driving voltage EVDD applied to the fourth node N4 is applied to the first electrode of the driving transistor DT connected to the second node N2 through the third transistor T3. The driving current Id flowing from the driving transistor DT to the light emitting diode EL via the fourth transistor T4 is independent of the level of the threshold voltage Vth of the driving transistor DT to compensate for the threshold voltage Vth of the driving transistor DT.

Next, referring to FIG. 5B, during the hold period, the pixel circuit and the light emitting diode operate as follows.

The hold period can include at least one bias section Tobs3, Tobs4 and the light-emitting section Te'. Repetitive descriptions to the same operations of the pixel circuit during the hold period as those during the refresh period will be avoided.

The hold period is different from the refresh period in that new data voltage Vdata is charged and applied to the gate electrode of the driving transistor DT during the refresh period as described above but the data voltage Vdata of the refresh period is maintained and used during the hold period. Therefore, the hold period does not include the initialization section Ti and the sampling section Ts unlike the refresh period.

In the operations of the hold period, only one on-bias stress (OBS) operation can be sufficient. However, in this embodiment, for the convenience of the driving circuit, the third scan signal SC3(*k*) in the hold period is driven like the third scan signal SC3(*k*) in the refresh period, and thus the on-bias stress (OBS) operation in the hold period can be performed twice as in the refresh period.

A difference in the driving signal between the refresh period of FIG. 5A and the hold period of FIG. 5B is the second and fourth scan signals SC2(*k*) and SC4(*k*). Because the initialization section Ti and the sampling section Ts are not necessary during the hold period, the second scan signal SC2(*k*) is always a high voltage and the fourth scan signal SC4(*k*) is always a low voltage unlike those during the refresh period. In other words, the second and seventh transistors T2 and T7 are always turned off.

Figure 6:
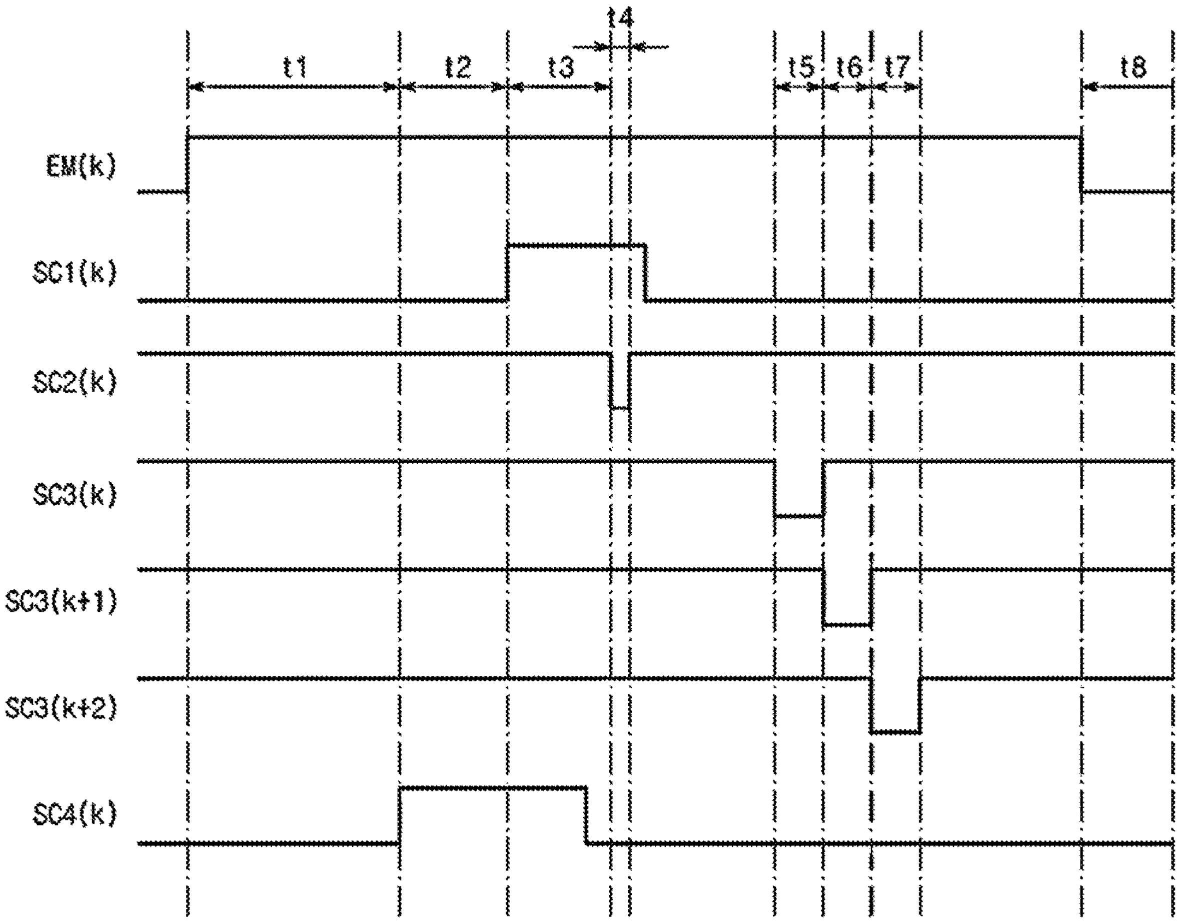
FIG. 6 is a waveform diagram of signals applied to a pixel of a display device according to an embodiment of the disclosure.
Figure 7:
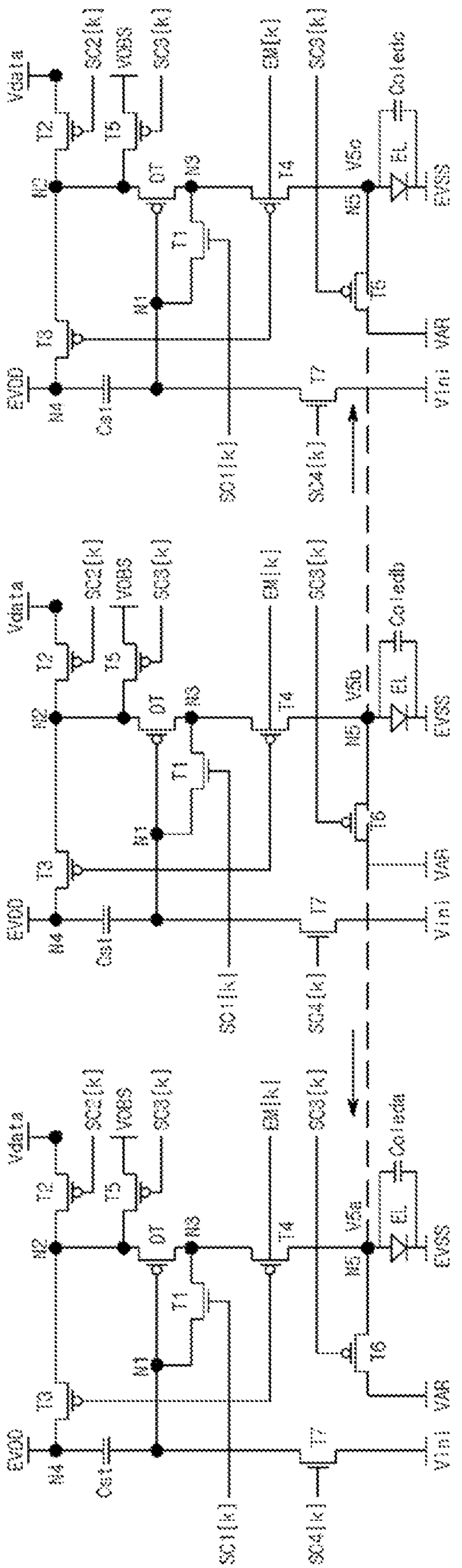
FIG. 7 is a schematic diagram showing a leakage current between a first sub-pixel, a second sub-pixel, and a third sub-pixel.

FIG. 6 is a waveform diagram of signals applied to a pixel of a display device according to an embodiment of the disclosure. FIG. 7 is a schematic diagram showing a leakage current between a first sub-pixel, a second sub-pixel, and a third sub-pixel.

Referring to FIG. 6, in a first period t1, the emission control signal EM(k) having a turn-off voltage level is applied to turn off the third and fourth transistors T3 and T4.

In a second period t2, the fourth scan signal SC4(*k*) having a turn-on voltage level is applied to turn on the seventh transistor T7, and the second initialization voltage Vini is applied to the gate electrode of the driving transistor DT or the first node N1. The second initialization voltage Vini can have a voltage level for turning on the driving transistor DT. In the second period t2, a sufficiently low voltage is applied to the first node N1.

In a third period t3, the first scan signal SC1(*k*) having the turn-on voltage level is applied to turn on the first transistor T1, the first node N1 and the third node N3 are connected for diode-connection of the driving transistor DT. In the third period t3, the seventh transistor T7 is turned off by the fourth scan signal SC4(*k*) having the turn-off voltage level.

In a fourth period t4, the second scan signal SC2(*k*) having the turn-on voltage level is applied to turn on the second transistor T2. The data voltage Vdata is applied to the second node N2 or the first electrode of the driving transistor DT. Because the second initialization voltage Vini applied to the gate electrode of the driving transistor DT in the second period t2 has a voltage level to turn on the driving transistor DT, the driving current flows from the first electrode of the driving transistor DT to the second electrode, and the voltage of the second electrode (or the third node N3) of the driving transistor DT is increased from the level of the second initialization voltage Vini to a voltage level equal to the sum of the data voltage Vdata and the threshold voltage Vth of the driving transistor (DT).

In a fifth period t5 to a seventh period t7, the third scan signals SC3(*k*), SC3(*k*+1) and SC3(*k*+2) having the turn-on voltage level are applied, respectively. The third scan signal SC3(*k*) can be applied to a red pixel, the third scan signal SC3(*k*+1) can be applied to a green pixel, and the third scan signal SC3(*k*+2) can be applied to a blue pixel. However, the periods during which the third scan signals SC3(*k*), SC3(*k*+1), and SC3(*k*+2) are applied can be reversed in order, unlike those shown in FIG. 6.

FIG. 7 illustrates a case where the same third scan signal (e.g., SC3(*k*)) is applied to each of the red pixel, the green pixel, and the blue pixel in the same period.

As shown in FIGS. 6 and 7, when the third scan signal (e.g., SC3(*k*) having a turn-on voltage level is applied to each of the red pixel PXa, the green pixel PXb, and the blue pixel PXc in the same period, the fifth and sixth transistors T5 and T6 are turned on. Accordingly, in each of the red pixel PXa, the green pixel PXb, and the blue pixel PXc, the first initialization voltage VAR is applied to the anode (or the fifth node N5) of the light emitting diode EL, and the bias voltage VOBS is applied to the third node N3. For example, the first initialization voltage VAR can have a voltage level lower than that of the bias voltage VOBS. In other words, in the period during which the third scan signal (e.g., SC3(*k*)) is applied, the first initialization voltage VAR is applied to the anode (or the fifth node N5) of the light emitting diode EL and the bias voltage VOBS is applied to the third node N3 in each of the red pixel PXa, the green pixel PXb, and the blue pixel PXc.

Then, in an eighth period t8, the emission control signal EM(k) having the turn-on voltage level is applied to turn on the third and fourth transistors T3 and T4. As described above, in the period during which the third scan signal (e.g., SC3(*k*)) is applied, when the fourth transistor T4 is turned on in the state that the first initialization voltage VAR is applied to the anode (or the fifth node N5) of the light emitting diode EL and the bias voltage VOBS is applied to the third node N3 in each of the red pixel PXa, the green pixel PXb, and the blue pixel PXc, the driving current flows from the third node N3 to the fifth node N5, and the voltages V5*a*, V5*b*, and V5*c* at the fifth node N5 increase. However, the increasing amounts of the voltages V5*a*, V5*b*, V5*c* at the fifth node N5 can differ according to the red pixel PXa, the green pixel PXb, and the blue pixel PXc. The increasing amounts of the voltages V5*a*, V5*b* and V5*c* of the fifth node N5 can vary depending on the capacitor Coleda, Coledb, and Coledc of each light emitting diode EL of the red pixel PXa, the green pixel PXb, and the blue pixel PXc.

$$V5' = \frac{(N3\ \text{Cap})}{(N3\ \text{Cap} + \text{coled})} \times (V5 - N3\ \text{Voltage}) \qquad \text{[Expression 1]}$$

In the Expression 1, V5' is the voltage of the fifth node N5 varied depending on the driving current flowing from the third node N3 to the fifth node N5, N3 Cap is the capacitance of the third node N3, V5 is the voltage of the fifth node N5 before the driving current flows, and N3 Voltage is the voltage of the third node N3.

In each of the red pixel PXa, the green pixel PXb, and the blue pixel PXc, the voltage at the third node N3 is the same as the bias voltage VOBS. Because the red pixel PXa, the green pixel PXb, and the blue pixel PXc have the same voltage at the third node N3, they have the same capacitance at the third node N3 and the same voltage at the fifth node N5 as the first initialization voltage VAR.

However, the capacitors Coleda, Coledb, and Coledc of the light emitting diode EL can have the largest capacitance in order of the capacitor Coledc of the blue pixel PXc, the capacitor Coleda of the red pixel PXa, and the capacitor Coledb of the green pixel PXb. The capacitance of the capacitor Coleda, Coledb or Coledc of the light emitting diode EL is proportional to the thickness of the light emitting layer EL and inversely proportional to its area. In the display device according to an embodiment of the disclosure, the area of the emissive layer EL is the largest in order of the green pixel PXb, the red pixel PXa, and the blue pixel PXc, and thus the capacitance is the largest in order of the capacitor Coledc of the blue pixel, the capacitor Coleda of the red pixel, and the capacitor Coledb of the green pixel.

Therefore, based on the foregoing Equation 1, the voltage V5' of the fifth node N5 can be large in order of the green pixel PXb, the red pixel PXa, and the blue pixel PXc. Furthermore, as described above with reference to FIG. 2, the first electron transport layer and the second electron transport layer of the light emitting layer EL are disposed extending without distinction to the red pixel PXa, the green pixel PXb, and the blue pixel PXc described with reference to FIG. 1, and the hole transport layer HTL of the first electron transport layer can be decreased in resistance at a high temperature. Therefore, in a high temperature environment, a leakage current can flow from the green pixel PXb having the highest voltage V5*b* at the fifth node N5 to the red pixel PXa and the blue pixel PXc through the hole transport layer HTL decreased in resistance and extended without distinction to the red pixel PXa, the green pixel PXb and the blue pixel PXc. In particular, a large leakage current can flow from the green pixel PXb, which has a large difference in the voltage level at the fifth node N5, to the blue pixel PXc, thereby decreasing the brightness of the green pixel PXb and increasing the brightness of the blue pixel PXc.

However, according to an embodiment of the disclosure, to equalize the voltage at the fifth node N5 varied by the driving current flowing from the third node N3 to the fifth node N5 in each of the red pixel PXa, the green pixel PXb and the blue pixel PXc, the red pixel PXa, the green pixel PXb and the blue pixel PXc are differently adjusted in the bias voltage VOBS, thereby differently adjusting the voltage of the third node N3.

Figure 8:
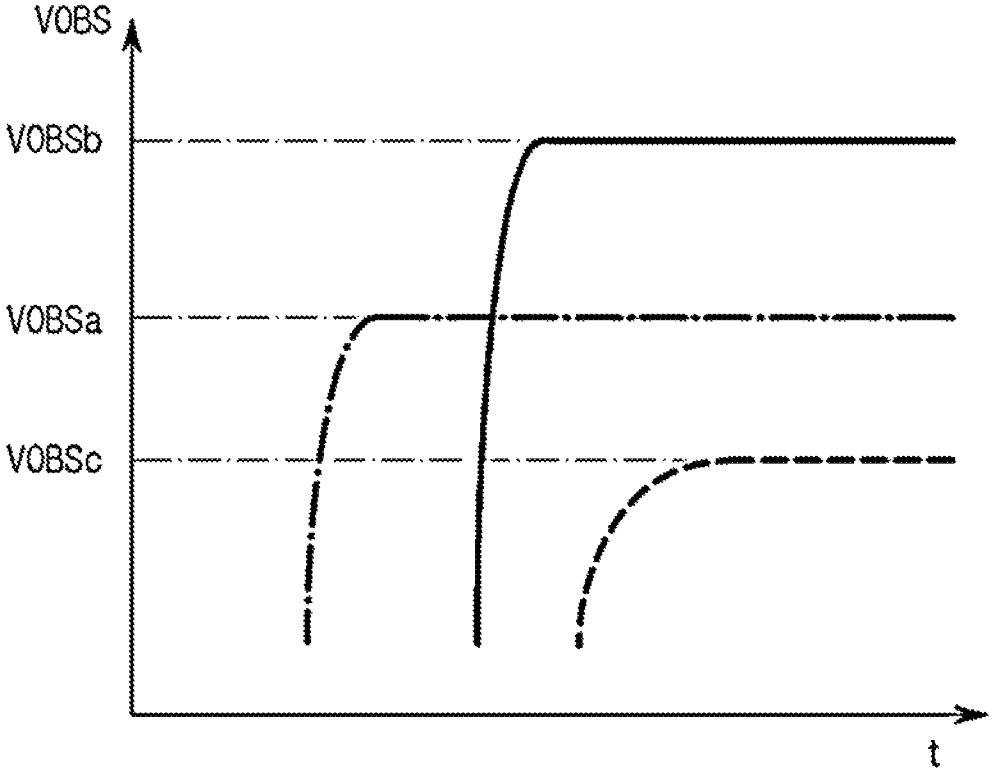
FIG. 8 is a graph showing levels of bias voltages applied to a first sub-pixel, a second sub-pixel, and a third sub-pixel of a display device according to an embodiment of the disclosure.
Figure 9:
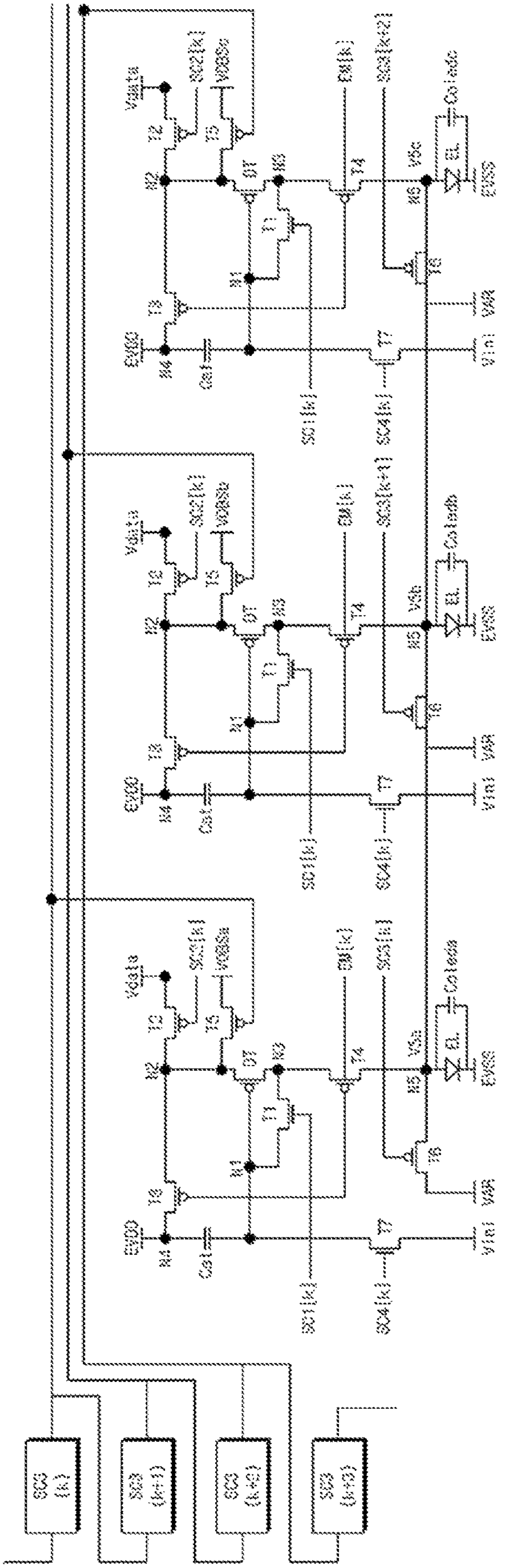
FIG. 9 is a diagram showing sub-pixels and third scan signal generators connected to the sub-pixels.
Figure 10:
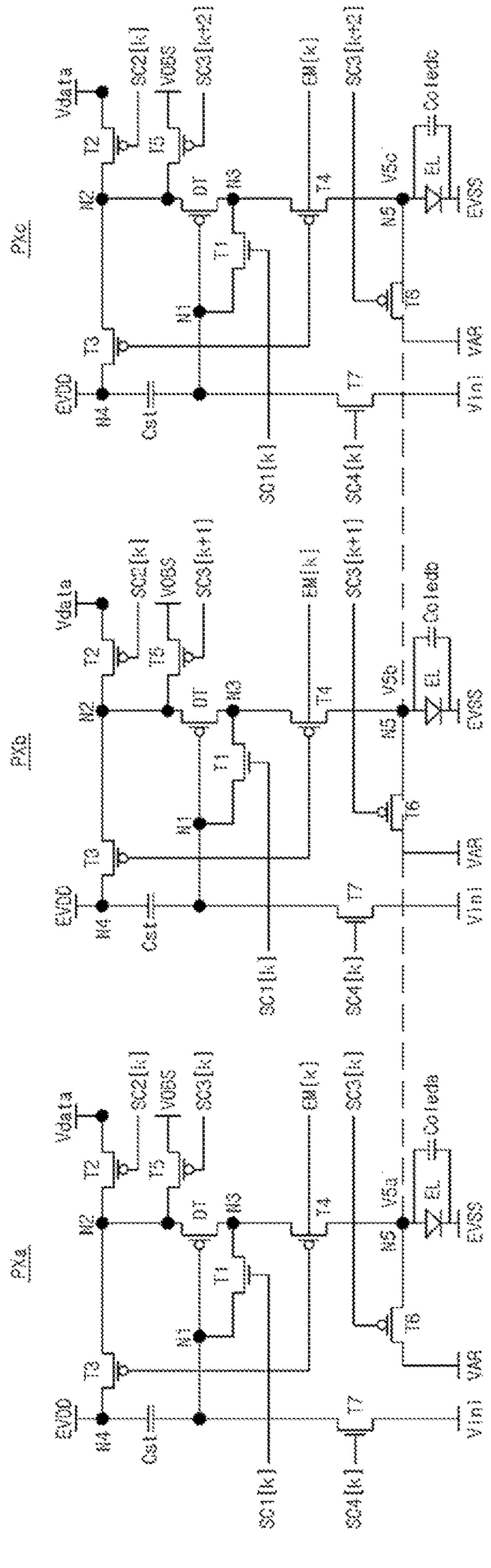
FIG. 10 is a schematic diagram showing improvement in a leakage current between a first sub-pixel, a second sub-pixel, and a third sub-pixel.

FIG. 8 is a graph showing levels of bias voltages applied to a first sub-pixel, a second sub-pixel, and a third sub-pixel of a display device according to an embodiment of the disclosure. FIG. 9 is a diagram showing sub-pixels and third scan signal generators connected to the sub-pixels. FIG. 10 is a schematic diagram showing improvement in a leakage current between a first sub-pixel, a second sub-pixel, and a third sub-pixel.

As shown in FIGS. 6, 8, and 9, the fifth and the sixth transistors T5 and T6 of the red pixel PXa are turned on by the third scan signal SC3(*k*) having the turn-on voltage level in the fifth period t5, and the first bias voltage VOBSa is applied to the third node N3 through the turned-on driving transistor DT. In the sixth period t6, the fifth and sixth transistors T5 and T6 of the green pixel PXb are turned on by the third scan signal SC3(*k*+1) having the turn-on voltage level, and the second bias voltage VOBSb is applied to the third node N3 through the turned-on driving transistor DT. In the seventh period t7, the fifth and sixth transistors T5 and T6 of the blue pixel PXc are turned on by the third scan signal SC3(*k*+2) having the turn-on voltage level, and the third bias voltage VOBSc is applied to the third node N3 through the turned-on driving transistor DT.

The second bias voltage VOBSb can be greater than each of the first and third bias voltages VOBSa and VOBSc, and the first bias voltage VOBSa can be greater than the third bias voltage VOBSc.

Then, in the eighth period t8, the emission control signal EM(k) having the turn-on voltage level is applied and the third and fourth transistors T3 and T4 of the red pixel PXa, the green pixel PXb, and the blue pixel PXc are turned on. As described above, in the periods t5 to t7 during which the third scan signals SC3(*k*), SC3(*k*+1), SC3(*k*+2) are applied, when the fourth transistor (T4) is turned on in the state that the first initialization voltage VAR is applied to the anode (or the fifth node N5) of the light emitting diode EL in each of the red pixel PXa, the green pixel PXb, and the blue pixel PXc, and the bias voltages VOBSa, VOBSb and VOBSc are applied to the third node N3, the driving current flows from the third node N3 to the fifth node N5, and the voltages V5*a*', V5*b*' and V5*c*' of the fifth node N5 increase. However, according to an embodiment of the disclosure, the second bias voltage VOBSb is larger than each of the first and third bias voltages VOBSa and VOBSc, and the first bias voltage VOBSa is larger than the third bias voltage VOBSc. Therefore, the red pixel PXa, the green pixel PXb, and the blue pixel PXc can have the same level of the voltages V5*a*', V5*b*' and V5*c*' at the fifth node N5.

Accordingly, a large leakage current flows from the green pixel PXb having a large difference in the voltage level at the fifth node N5 to the blue pixel PXc, thereby preventing the brightness of the green pixel PXb from decreasing and the brightness of the blue pixel PXc from increasing to improve the display performance of the display device in a high temperature environment. As a result, the display device can improve in high efficiency and high color reproduction, thereby providing a low power-consumption display device.

For example, a display device according to an example of the disclosure includes a first sub-pixel, a second sub-pixel, and a third sub-pixel, where each of the first sub-pixel, the second sub-pixel, and the third sub-pixel includes a driving transistor, a first transistor, and a second transistor. The driving transistor includes a gate electrode connected to a first node, a first electrode connected to a second node, and a second electrode connected to a third node, and provides a driving current to a light emitting diode. The first transistor includes a first electrode receiving a bias voltage, a second electrode connected to the second node, and a gate electrode to which a third scan signal is applied. The second transistor includes a first electrode connected to the third node, a second electrode connected to an anode of the light emitting diode, and a gate electrode to which an emission control signal is applied, wherein the bias voltages applied to the first electrodes of the first transistors in the first sub-pixel, the second sub-pixel, and the third sub-pixel are different in level.

For example, the level of the bias voltage applied to the first electrode of the first transistor in the second sub-pixel can be higher than each of the level of the bias voltage applied to the first electrode of the first transistor in the first sub-pixel and the level of the bias voltage applied to the first electrode of the first transistor in the third sub-pixel.

For example, the level of the bias voltage applied to the first electrode of the first transistor in the first sub-pixel can be higher than the level of the bias voltage applied to the first electrode of the first transistor in the third sub-pixel.

For example, the first sub-pixel can be a red pixel, the second sub-pixel can be a green pixel, and the third sub-pixel can be a blue pixel.

For example, the capacitance of the light emitting diode in the third sub-pixel can be larger than capacitance of the light emitting diode in the first sub-pixel and the capacitance of the light emitting diode in the second sub-pixel, and the capacitance of the light emitting diode in the first sub-pixel can be larger than the capacitance of the light emitting diode in the second sub-pixel.

For example, the voltages applied to the anodes of the light emitting diodes in the first sub-pixel, the second sub-pixel, and the third sub-pixel can have the same level before an emission period during which the driving current can be provided to the light emitting diode.

For example, the periods during which the bias voltages are applied to the first electrodes of the first transistors in the first sub-pixel, the second sub-pixel, and the third sub-pixel are different.

Although a few embodiments have been described with reference to the accompanying drawings, it will be understood by a person having ordinary knowledge in the art to which the disclosure pertains that the different embodiments can be made without departing from the technical spirit or features. Accordingly, the embodiments described above should be understood to be illustrative and non-limiting in all respects. In addition, the scope of the disclosure is defined by the following appended claims rather than by the foregoing detailed description. Further, the sprit and scope of the appended claims and all modifications or variations from the equivalents thereof should be construed as falling into the scope of disclosure.

What is claimed is:

1. A display device comprising:

a first sub-pixel, a second sub-pixel, and a third sub-pixel disposed on a substrate, each of the first sub-pixel, the second sub-pixel, and the third sub-pixel comprising:

a driving transistor comprising a gate electrode connected to a first node, a first electrode connected to a second node, and a second electrode connected to a third node, the driving transistor configured to provide a driving current to a light emitting diode;

a first transistor comprising a first electrode configured to receive a bias voltage, a second electrode connected to the second node, and a gate electrode to which a third scan signal is applied; and a second transistor comprising a first electrode connected to the third node, a second electrode connected to an anode of the light emitting diode, and a gate electrode to which an emission control signal is applied, wherein the bias voltages applied to the first electrodes of the first transistors in the first sub-pixel, the second sub-pixel, and the third sub-pixel are different in level;

wherein the level of the bias voltage applied to the first electrode of the first transistor in the second sub-pixel is higher than the level of the bias voltage applied to the first electrode of the first transistor in the first sub-pixel or the level of the bias voltage applied to the first electrode of the first transistor in the third sub-pixel;

wherein the level of the bias voltage applied to the first electrode of the first transistor in the first sub-pixel is higher than the level of the bias voltage applied to the first electrode of the first transistor in the third sub-pixel; and wherein the first sub-pixel comprises a red pixel, the second sub-pixel comprises a green pixel, and the third sub-pixel comprises a blue pixel.

2. The display device of claim 1, wherein a capacitance of the light emitting diode in the third sub-pixel is larger than a capacitance of the light emitting diode in the first sub-pixel or a capacitance of the light emitting diode in the second sub-pixel, and the capacitance of the light emitting diode in the first sub-pixel is larger than the capacitance of the light emitting diode in the second sub-pixel.

3. The display device of claim 1, wherein voltages applied to the anodes of the light emitting diodes in the first sub-pixel, the second sub-pixel, and the third sub-pixel have a same level before an emission period during which the driving current is provided to the light emitting diode.

4. The display device of claim 1, wherein periods during which the bias voltages are applied to the first electrodes of the first transistors in the first sub-pixel, the second sub-pixel, and the third sub-pixel are different periods.

5. A display panel comprising:

a first sub-pixel, a second sub-pixel, and a third sub-pixel disposed on a substrate, each of the first sub-pixel, the second sub-pixel, and the third sub-pixel comprising:

a driving transistor comprising a gate electrode connected to a first node, a first electrode connected to a second node, and a second electrode connected to a third node, the driving transistor configured to provide a driving current to a light emitting diode;

a first transistor comprising a first electrode receiving a bias voltage, a second electrode connected to the second node, and a gate electrode to which a third scan signal is applied; and a second transistor comprising a first electrode connected to the third node, a second electrode connected to an anode of the light emitting diode, and a gate electrode to which an emission control signal is applied, wherein the bias voltages applied to the first electrodes of the first transistors in the first sub-pixel, the second sub-pixel, and the third sub-pixel are different in level;

wherein the level of the bias voltage applied to the first electrode of the first transistor in the second sub-pixel is higher than the level of the bias voltage applied to the first electrode of the first transistor in the first sub-pixel or the level of the bias voltage applied to the first electrode of the first transistor in the third sub-pixel;

wherein the level of the bias voltage applied to the first electrode of the first transistor in the first sub-pixel is higher than the level of the bias voltage applied to the first electrode of the first transistor in the third sub-pixel; and wherein the first sub-pixel comprises a red pixel, the second sub-pixel comprises a green pixel, and the third sub-pixel comprises a blue pixel.

6. The display panel of claim 5, wherein a capacitance of the light emitting diode in the third sub-pixel is larger than a capacitance of the light emitting diode in the first sub-pixel or a capacitance of the light emitting diode in the second sub-pixel, and the capacitance of the light emitting diode in the first sub-pixel is larger than the capacitance of the light emitting diode in the second sub-pixel.

7. The display panel of claim 5, wherein voltages applied to the anodes of the light emitting diodes in the first sub-pixel, the second sub-pixel, and the third sub-pixel have a same level before an emission period during which the driving current is provided to the light emitting diode.

8. The display panel of claim 5, wherein periods during which the bias voltages are applied to the first electrodes of the first transistors in the first sub-pixel, the second sub-pixel, and the third sub-pixel are different periods.

* * * * *